(12) United States Patent
Shigematsu

(10) Patent No.: US 11,335,972 B2
(45) Date of Patent: May 17, 2022

(54) LITHIUM ION BATTERY SEPARATOR AND LITHIUM ION BATTERY

(71) Applicant: MITSUBISHI PAPER MILLS LIMITED, Tokyo (JP)

(72) Inventor: Toshihiro Shigematsu, Tokyo (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 444 days.

(21) Appl. No.: 16/470,674

(22) PCT Filed: Dec. 18, 2017

(86) PCT No.: PCT/JP2017/045327
§ 371 (c)(1),
(2) Date: Jun. 18, 2019

(87) PCT Pub. No.: WO2018/123689
PCT Pub. Date: Jul. 5, 2018

(65) Prior Publication Data
US 2020/0091486 A1    Mar. 19, 2020

(30) Foreign Application Priority Data

| Dec. 27, 2016 | (JP) | JP2016-252401 |
| Nov. 21, 2017 | (JP) | JP2017-223561 |
| Nov. 21, 2017 | (JP) | JP2017-223562 |
| Nov. 24, 2017 | (JP) | JP2017-225923 |

(51) Int. Cl.
*H01M 50/44* (2021.01)
*H01M 10/0525* (2010.01)
*H01M 50/411* (2021.01)

(52) U.S. Cl.
CPC ....... *H01M 50/44* (2021.01); *H01M 10/0525* (2013.01); *H01M 50/411* (2021.01)

(58) Field of Classification Search
CPC ............... H01M 50/44; H01M 50/411
See application file for complete search history.

(56) References Cited

U.S. PATENT DOCUMENTS

| 6,818,352 B2 | 11/2004 | Daido et al. |
| 6,881,438 B2 | 4/2005 | Daido et al. |
| 6,905,798 B2 | 6/2005 | Tsukuda et al. |
| 7,094,497 B2 | 8/2006 | Daido et al. |
| 2005/0079406 A1 | 4/2005 | Daido et al. |
| 2007/0167101 A1 | 7/2007 | Naruse et al. |
| 2009/0029262 A1 | 1/2009 | Naruse |
| 2009/0280308 A1 | 11/2009 | Tsukuda et al. |

FOREIGN PATENT DOCUMENTS

| CN | 109661737 | 4/2019 |
| JP | 2003-123728 | 4/2003 |
| JP | 2004-146137 | 5/2004 |
| JP | 2006-19191 | 1/2006 |
| JP | 2006-245550 | 9/2006 |
| JP | 2007-67155 | 3/2007 |
| JP | 2007-317675 | 12/2007 |
| JP | 2012-94288 | 5/2012 |
| JP | 2012-155941 | 8/2012 |
| JP | 2012-188774 | 10/2012 |
| JP | 5651120 | 1/2015 |
| WO | 01/93350 | 12/2001 |
| WO | 2011/046066 | 4/2011 |
| WO | 2012/008559 | 1/2012 |
| WO | 2016/043142 | 3/2016 |
| WO | 2018/047742 | 3/2018 |

OTHER PUBLICATIONS

WO2011/046066A1 Translation from Espacenet (Year: 2011).*
Extended European Search Report dated Oct. 7, 2020 in corresponding European Patent Application No. 17889490.3.
International Search Report dated Mar. 6, 2018 in International (PCT) Application No. PCT/JP2017/045327.
Partial Supplementary European Search Report dated May 14, 2020 in corresponding European Patent Application No. 17889490.3.

* cited by examiner

*Primary Examiner* — Nathanael T Zemui
(74) *Attorney, Agent, or Firm* — Wenderoth, Lind & Ponack, L.L.P.

(57) ABSTRACT

It is an object of the present invention to provide a lithium ion battery separator which can be made thin, is excellent in tensile strength and cuttability and has low internal resistance, a low incidence of internal short circuit failure and high cycle characteristics and a lithium ion battery including the separator. In a lithium ion battery separator containing heat-resistant fibers and synthetic resin short fibers, fibrillated heat-resistant fibers having a modified freeness of not more than 300 ml are contained as the heat-resistant fibers, and the content of the fibrillated heat-resistant fibers having a modified freeness of not more than 300 ml is not less than 1.0 mass % to less than 5.0 mass % based on the total of all the fiber components contained in the separator. Modified freeness: This is a value measured in accordance with JIS P8121-2:2012 except that an 80-mesh wire net having a wire diameter of 0.14 mm and an opening of 0.18 mm is used as a screening plate and the concentration of a sample is 0.1%.

10 Claims, No Drawings

LITHIUM ION BATTERY SEPARATOR AND LITHIUM ION BATTERY

TECHNICAL FIELD

The present invention relates to a lithium ion battery separator and a lithium ion battery. The term "lithium ion battery separator" may be simply referred to as "separator". The term "lithium ion battery" may be simply referred to as "battery".

BACKGROUND ART

Due to the spread and improved performance of mobile electronic equipment in recent years, a secondary battery having high energy density is desired. As this type of battery, a lithium ion battery containing an organic electrolytic solution has been attracting attention. Since this lithium ion battery can achieve an average voltage of about 3.7 V which is about three times as large as a conventional alkaline secondary battery, it has high energy density. However, since an aqueous electrolytic solution cannot be used in this battery unlike the alkaline secondary battery, an organic electrolytic solution having sufficiently high oxidation and reduction resistance is used. As the organic electrolytic solution is combustible, there is the risk of firing and therefore, close attention is paid to safety at the time of its use. Out of plural causes of exposure to a firing risk, overcharging is especially dangerous.

To prevent overcharging, the current lithium ion battery performs constant-voltage/constant-current charging and is equipped with a precision IC (protection circuit). The cost of this protection circuit is high, which is one of the causes of raising the cost of the lithium ion battery.

When overcharging is to be prevented with the protection circuit, it is naturally possible that the protection circuit does not operate properly, and it is hard to say that the lithium ion battery is essentially safe. The current lithium ion battery is equipped with means such as a safety valve, PTC element or separator having a heat fuse function in order to destroy the battery safely when the protection circuit is destroyed at the time of overcharging and overcharging is performed. However, even when the lithium ion battery is equipped with the above means, according to overcharging conditions, safety at the time of overcharging is not surely ensured and the firing accident of a lithium ion battery actually occurs even nowadays.

As the lithium ion battery separator, a porous film made of a polyolefin such as polyethylene or polypropylene is often used. The porous film made of a polyolefin has a heat fuse function (shut-down function) that it melts and closes pores to prevent the movement of an lithium ion and shut down a current when the inside temperature of a battery rises up to 130° C. However, when the temperature further rises in some situation, there is suggested the possibility that the polyolefin itself melts to cause a short circuit, resulting in a thermal runaway. Then, a heat-resistant separator which does not melt and shrink at a temperature close to 200° C. is now under development.

As the heat-resistant separator, there is disclosed a separator composed of a polyester nonwoven fabric (refer to Patent Document 1). However, the separator composed of a nonwoven fabric has problems that pores in the nonwoven fabric are large, a leakage current is large, electrolytic solution holding performance is low, and the internal resistance of the separator is high.

As a separator having high safety at the time of overcharging, there is disclosed a lithium ion secondary battery separator composed of a porous sheet made of a nonwoven fabric or a porous film incorporating this porous sheet and containing a porous organic polymer which swells with an electrolytic solution to hold it (refer to Patent Document 2). However, since the porous sheet made of a nonwoven fabric of Patent Document 2 has large voids and a large number of through holes, an internal short circuit or self-discharge tends to occur. In fact, the separator is caused to function by forming a porous film including a porous film containing a porous polymer which swells with the electrolytic solution to hold it, or polyvinylidene fluoride in examples. Therefore, in this case, the separator has problems that the film thickness is large at 24 μm or more, it is difficult to increase the capacity, and it is necessary to solidify, rinse and dry the porous polymer for the formation of the porous film, thereby boosting cost.

As a separator which is capable of preventing a short circuit at a high temperature, there are disclosed a lithium ion secondary battery separator which is composed of a nonwoven fabric containing heat-resistant pulp fibers having a melting point or carbonization point of 300° C. or higher and thermoplastic fibers having a melting point of 200° C. or higher (refer to Patent Document 3), a separator for electrochemical elements containing at least one type of organic fibers at least some of which are fibrillated to a fiber diameter of not more than 1 μm and at least one type of nonfibrillated organic fibers having a fineness of not more than 0.5 dtex as a separator which is excellent in heat resistance, electrolytic solution holding property, internal short circuit prevention property and windability and can reduce internal resistance and may have long service life (refer to Patent Document 4), and a separator for electrochemical elements which is composed of a nonwoven fabric containing a fibrillated polymer having a melting point or thermal decomposition temperature of 250° C. or higher at least part of which has a fiber diameter of not more than 1 μm and a weight average fiber length of 0.2 to 2 mm and organic fibers having a fineness of not more than 3.3 dtex as a separator having excellent reflow heat resistance, low internal resistance and excellent high-speed charging and discharging properties (refer to Patent Document 5).

Out of these Patent Documents 3 to 5, the separator of Patent Document 3 has a content of the heat-resistant pulp fibers of preferably 30 to 80 mass % and the separators of examples have a basis weight of 20 g/m$^2$ and a large thickness of 26 μm, the separator of Patent Document 4 has a content of the fibrillated organic fibers or liquid crystal polymer fibers of preferably 10 to 70 mass % and the separators of examples have a basis weight of not less than 16 g/m$^2$ and a large thickness of not less than 30 μm, and the separator of Patent Document 5 has a content of the fibrillated polymer of preferably not less than 10 mass % and the separators of examples have a basis weight of not less than 18 g/m$^2$ and a large thickness of not less than 55 μm. It is difficult for all of the above separators to meet the requirement for high capacity in recent years.

In the separators disclosed by Patent Documents 3 to 5, the lower limit of the preferred content of the heat-resistant fibers such as the heat-resistant pulp fibers, fibrillated organic fibers and fibrillated polymer is 10 mass %. However, since the heat-resistant fibers are mostly rigid and have high strength, when the content thereof is not less than 10 mass %, the separator is hardly smashed and it is difficult to reduce the thickness of the separator. When the separator is smashed by applying heat or a load, the resistance of the separator becomes high, when the separator is cut to a predetermined width to be used as a separator, it is difficult to cut the separator in the slitting step, and it is also difficult to fusion-cut the separator in the step of laminating an electrode. Further, as bonding force between heat-resistant fibers and bonding force between a heat-resistant fiber and another fiber are low, when the content of the heat-resistant fibers is not less than 10 mass %, the tensile strength of the separator becomes low, whereby special care must be paid in the operation of the electrode lamination step.

PRIOR ART DOCUMENTS

Patent Documents

Patent Document 1: JP-A 2003-123728
Patent Document 2: JP-A 2007-317675
Patent Document 3: JP-A 2006-19191
Patent Document 4: WO01/93350
Patent Document 5: JP-A 2004-146137

DISCLOSURE OF THE INVENTION

Problem to be Solved by the Invention

It is an object of the present invention to provide a lithium ion battery separator which can be made thin, is excellent in tensile strength and cuttability and has low internal resistance, a low incidence of internal short circuit failure and high cycle characteristics as well as a lithium ion battery including the separator.

Means for Solving the Problem

The inventors of the present invention conducted intensive studies to solve the above problems and made the following invention.

(1-1) A lithium ion battery separator comprising heat-resistant fibers and synthetic resin short fibers, wherein fibrillated heat-resistant fibers having a modified freeness of not more than 300 ml are contained as the heat-resistant fibers, and the content of the fibrillated heat-resistant fibers having a modified freeness of not more than 300 ml is not less than 1.0 mass % to less than 5.0 mass % based on the total of all the fiber components contained in the separator.

(1-2) The lithium ion battery separator in the above paragraph (1-1), wherein the content of the synthetic resin short fibers is 90.0 to 99.0 mass % based on the total of all the fiber components contained in the separator.

(1-3) The lithium ion battery separator in the above paragraph (1-1), wherein the content of the synthetic resin short fibers is more than 95.0 mass % to not more than 99.0 mass % based on the total of all the fiber components contained in the separator.

(2-1) A lithium ion battery separator comprising heat-resistant fibers and synthetic resin short fibers, wherein fibrillated heat-resistant fibers having a modified freeness of not more than 300 ml and fibrillated heat-resistant fibers having a modified freeness of more than 300 ml are contained as the heat-resistant fibers, and the total content of the fibrillated heat-resistant fibers having a modified freeness of not more than 300 ml and the fibrillated heat-resistant fibers having a modified freeness of more than 300 ml is not less than 2.0 mass % to less than 9.0 mass % based on the total of all the fiber components contained in the separator.

(2-2) The lithium ion battery separator in the above paragraph (2-1), wherein the content of the fibrillated heat-resistant fibers having a modified freeness of not more than 300 ml is not less than 1.0 mass % to less than 5.0 mass % and the content of the fibrillated heat-resistant fibers having a modified freeness of more than 300 ml is not less than 1.0 mass % to less than 4.0 mass % based on the total of all the fiber components contained in the separator.

(2-3) The lithium ion battery separator in the above paragraph (2-1) or (2-2), wherein the content of the synthetic resin short fibers is 90.0 to 98.0 mass % based on the total of all the fiber components contained in the separator.

(3-1) A lithium ion battery separator comprising heat-resistant fibers and synthetic resin short fibers, wherein heat-resistant fibers having a modified freeness of not more than 300 ml and a fibrid made of para-aromatic polyamide having a modified freeness of not more than 300 ml are contained as the heat-resistant fibers, and the total content of the heat-resistant fibers is not less than 1.0 mass % to less than 5.0 mass % based on the total of all the fiber components contained in the separator.

(3-2) The lithium ion battery separator in the above paragraph (3-1), wherein the content of the synthetic resin short fibers is 90.0 to 99.0 mass % based on the total of all the fiber components contained in the separator.

(3-3) The lithium ion battery separator in the above paragraph (3-1), wherein the content of the synthetic resin short fibers is more than 95.0 mass % to not more than 99.0 mass % based on the total of all the fiber components contained in the separator.

(4-1) A lithium ion battery separator comprising heat-resistant fibers and synthetic resin short fibers, wherein a fibrid made of para-aromatic polyamide, fibrillated heat-resistant fibers having a modified freeness of not more than 300 ml and fibrillated heat-resistant fibers having a modified freeness of more than 300 ml are contained as the heat-resistant fibers, and the total content of the heat-resistant fibers is not less than 2.0 mass % to less than 9.0 mass % based on the total of all the fiber components contained in the separator.

(4-2) The lithium ion battery separator in the above paragraph (4-1), wherein the content of the fibrid made of para-aromatic polyamide is not less than 0.4 mass % to less than 2.5 mass %, the content of the fibrillated heat-resistant fibers having a modified freeness of more than 300 ml is not less than 1.0 mass % to less than 4.0 mass %, and the content of the fibrillated heat-resistant fibers having a modified freeness of not more than 300 ml is not less than 0.6 mass % to less than 4.6 mass % based on the total of all the fiber components contained in the separator.

(4-3) The lithium ion battery separator in the above paragraph (4-1) or (4-2), wherein the content of the synthetic resin short fibers is 90.0 to 98.0 mass % based on the total of all the fiber components contained in the separator.

(5) A lithium ion battery including the lithium ion battery separator in any one of (1-1) to (1-3), (2-1) to (2-3), (3-1) to (3-3) and (4-1) to (4-3).

The term "modified freeness" is "a value measured in accordance with JIS P8121-2:2012 except that an 80-mesh wire net having a wire diameter of 0.14 mm and an opening of 0.18 mm is used as a screening plate and the concentration of a sample is 0.1%".

Effect of the Invention

The lithium ion battery separator of the present invention can be made thin and is excellent in tensile strength and cuttability. The lithium ion battery separator of the present invention can attain effects such as low internal resistance, a low incidence of internal short circuit failure and high cycle characteristics.

PRACTICAL EMBODIMENT OF THE INVENTION

The lithium ion battery in the present invention refers to a secondary battery in which a lithium ion moves between a negative electrode and a positive electrode upon discharge and charge. Examples of the lithium ion battery include a lithium ion secondary battery and a lithium ion polymer secondary battery. The lithium ion battery includes a lithium ion secondary battery comprising a lithium storage material as a negative electrode active material and a metal lithium secondary battery comprising metal lithium as a negative electrode active material.

The lithium ion battery includes a positive electrode, a separator and a negative electrode as members. In general, it has a structure that a positive electrode, a separator and a negative electrode are laminated in the mentioned order. An electrolytic solution is absorbed into the positive electrode, the negative electrode and the separator. The types of the laminate structure include a cylindrical type in which all the members are laminated together and then rolled, a roll flat type in which the cylindrical type is squashed to form two flat surfaces and curved both end parts, a ninety-nine-fold type in which leaf electrodes are inserted into a separator which has been folded 99 times, and a leaf laminate type in which a leaf separator and leaf electrodes are laminated together.

A lithium storage material is used as the negative electrode active material of the lithium ion battery. Examples of the lithium storage material include carbon-based materials, silicon-based materials and composite oxides of a transition metal and lithium. The carbon-based materials are preferably used as they are excellent in balance between the amount of lithium able to be stored per mass and the difficulty of deterioration caused by the absorption and release of lithium. The carbon-based materials include graphite's such as natural graphite and artificial graphite; amorphous carbons such as hard carbon, soft carbon and mesoporous carbon; and nanocarbon materials such as carbon nanotube and graphene. The silicon-based materials are preferably used as the amount of lithium able to be stored per mass is large. The silicon-based materials include silicon, silicon monoxide (SiO) and silicon dioxide ($SiO_2$). Lithium titanate which is a kind of composite oxide of a transition metal and lithium is preferably used as deterioration caused by the absorption and release of lithium hardly occurs.

As the negative electrode active material used together with the lithium ion battery separator in the present invention, lithium titanate is particularly preferably used. Examples of lithium titanate include spinel type lithium titanate ($Li_{4+x}Ti_5O_{12}$ ("x" changes between 0 and 3 according to a charge or discharge state)) and ramsdellite type lithium titanate ($Li_{2+x}Ti_3O_7$ ("x" changes between 0 and 2 according to a charge or discharge state)). When lithium titanate is used as the negative electrode active material, a single lithium titanate may be used or a mixture of two or more lithium titanates may be used.

An example of the negative electrode of the lithium ion battery is an electrode produced by applying a negative electrode material containing the above negative electrode active material to a metal foil. The negative electrode material may be mixed with a binder such as polyvinylidene fluoride or styrene-butadiene copolymer; conductive agent such as carbon black or nanocarbon material; dispersant; and thickener as required. Examples of the metal used in the metal foil include copper and aluminum.

Examples of the positive electrode active material of the lithium ion battery include a composite oxide of a transition metal and lithium, a composite salt having an olivine structure of a transition metal and lithium, and sulfur. An example of the composite oxide of a transition metal and lithium is a composite oxide of lithium and at least one transition metal selected from cobalt, nickel and manganese. A typical metal such as aluminum or magnesium and a transition metal such as titanium or chromium may be further combined with the composite oxide. An example of the composite salt having an olivine structure of a transition metal and lithium is a composite salt having an olivine structure of lithium and at least one transition metal selected from iron and manganese.

An example of the positive electrode of the lithium ion battery is an electrode produced by applying a positive electrode material containing the above positive electrode active material to a metal foil. The positive electrode material may be mixed with a binder such as polyvinylidene fluoride or acrylic acid ester copolymer; conductive agent such as carbon black or nanocarbon material; dispersant; and thickener as required. An example of the metal used in the metal foil is aluminum.

Examples of the electrolytic solution of the lithium ion battery include a solution prepared by dissolving a lithium salt in a polar solvent and a solution prepared by dissolving a lithium salt in an ion liquid. Examples of the polar solvent used in the electrolytic solution of the lithium secondary battery include carbonates such as propylene carbonate (PC), ethylene carbonate (EC), diethyl carbonate (DEC) and ethyl methyl carbonate (EMC); and fatty acid esters such as ethyl acetate, propyl acetate and ethyl propionate. Examples of the lithium salt used in the electrolytic solution of the lithium secondary battery include lithium hexafluorophosphate ($LiPF_6$) and lithium tetrafluoroborate ($LiBF_4$). As a solid electrolyte, a solution prepared by dissolving a lithium salt in polyethylene glycol or derivative thereof, polymethacrylic acid derivative, polysiloxane or derivative thereof, or gel-like polymer such as polyvinylidene fluoride is used.

The lithium ion battery separator of the present invention is characterized in that it contains heat-resistant fibers and synthetic resin short fibers and fibrillated heat-resistant fibers having a modified freeness of not more than 300 ml are contained as the heat-resistant fibers and an essential component.

In the present invention, the following brief expressions may be used for three components below.

Fibrid made of para-aromatic polyamide: fibrid
Fibrillated heat-resistant fibers having a modified freeness of not more than 300 ml: fibrillated heat-resistant fibers (I)
Fibrillated heat-resistant fibers having a modified freeness of more than 300 ml: fibrillated heat-resistant fibers (II)

The separator (1) of the present invention is characterized in that it contains heat-resistant fibers and synthetic resin fibers, the fibrillated heat-resistant fibers (I) are contained as the heat-resistant fibers, and the content of the fibrillated heat-resistant fibers (I) is not less than 1.0 mass % to less than 5.0 mass % based on the total of all the fiber components contained in the separator.

The content of the fibrillated heat-resistant fibers (I) is not less than 1.0 mass % to less than 5.0 mass % based on the total of all the fiber components contained in the separator (1). The content is preferably not less than 2.0 mass %, more preferably not less than 3.0 mass %. It is preferably less than 4.5 mass %. When the content of the fibrillated heat-resistant fibers (I) is not less than 5.0 mass %, it is difficult to smash the separator to reduce the thickness of the separator. When the thickness is reduced by applying heat or a pressure, internal resistance becomes worse and high-rate discharge characteristics deteriorate. Meanwhile, when the content of the fibrillated heat-resistant fibers (I) is less than 1.0 mass %, though the tensile strength of the separator becomes high, a leakage current or the incidence of internal short circuit failure may become worse.

The content of the synthetic resin short fibers is preferably not less than 90.0 mass %, more preferably not less than 92.0 mass %, much more preferably not less than 94.0 mass %, particularly preferably more than 95.0 mass % based on the total of all the fiber components contained in the separator (1). The content is preferably not more than 99.0 mass %, more preferably not more than 98.0 mass %, much more preferably not more than 96.0 mass %. When the content of the synthetic resin short fibers is more than 99.0 mass %, though the tensile strength of the separator becomes high, a leakage current or the incidence of internal short circuit failure may become worse. When the content of the synthetic resin short fibers is less than 90.0 mass % and the basis weight of the separator is reduced, mechanical strength becomes low, whereby the separator may be broken at the time of forming a battery.

The most preferred separator (1) contains fibrillated heat-resistant fibers and synthetic resin short fibers as the fiber components. In this case, the content of the synthetic resin short fibers is more than 95.0 mass % to not more than 99.0 mass % based on the total of all the fiber components contained in the separator (1). The content is preferably not more than 98.0 mass %, more preferably not more than 97.0 mass %. It is preferably more than 95.5 mass %.

The separator (2) of the present invention is characterized in that it contains heat-resistant fibers and synthetic resin short fibers, the fibrillated heat-resistant fibers (I) and the fibrillated heat-resistant fibers (II) are contained as the heat-resistant fibers, and the total content of the fibrillated heat-resistant fibers (I) and the fibrillated heat-resistant fibers (II) is not less than 2.0 mass % to less than 9.0 mass % based on the total of all the fiber components contained in the separator.

The total content of the fibrillated heat-resistant fibers (I) and the fibrillated heat-resistant fibers (II) is not less than 2.0 mass % to less than 9.0 mass %, preferably not less than 3.0 mass % to less than 8.0 mass %, more preferably not less than 3.5 mass % to less than 6.0 mass %, particularly preferably not less than 3.5 mass % to less than 5.0 mass % based on the total of all the fiber components contained in the separator (2). When the total content of the fibrillated heat-resistant fibers (I) and (II) is not less than 9.0 mass %, it is difficult to reduce the thickness of the separator. Further, tensile strength and internal resistance deteriorate. When the total content of the fibrillated heat-resistant fibers (I) and (II) is less than 2.0 mass %, though the tensile strength of the separator becomes high, the effect of improving a leakage current becomes small.

The content of the fibrillated heat-resistant fibers (I) is preferably not less than 1.0 mass % to less than 5.0 mass %, and the content of the fibrillated heat-resistant fibers (II) is preferably not less than 1.0 mass % to less than 4.0 mass % based on the total of all the fiber components contained in the separator (2).

The content of the fibrillated heat-resistant fibers (I) is preferably not less than 1.0 mass % to less than 5.0 mass %, more preferably not less than 2.0 mass % to less than 5.0 mass %, much more preferably not less than 2.5 mass % to less than 4.0 mass %, particularly preferably not less than 2.5 mass % to less than 3.5 mass % based on the total of all the fiber components contained in the separator (2). Within this range, the number of thick stem fibers before the fibrillation of the heat-resistant fibers is small and the fibrillated fibers are fine, whereby there is no hindrance to the control of the thickness of the separator and the cuttability of the separator, and the pore diameter becomes small. Therefore, the retainability of the electrolytic solution becomes high, thereby producing the effect of improving the resistance of the separator. When the content is not less than 5.0 mass %, tensile strength may lower and the resistance of the separator may become worse. When the content is less than 1.0 mass %, the effect obtained by blending the fibrillated heat-resistant fibers may be rarely observed.

The content of the fibrillated heat-resistant fibers (II) is preferably not less than 1.0 mass % to less than 4.0 mass %, more preferably 1.0 to 3.0 mass %, much more preferably 1.0 to 2.0 mass %, particularly preferably 1.0 to 1.5 mass % based on the total of all the fiber components contained in the separator (2). When the fibrillated heat-resistant fibers (II) are used in this range, though the fibrillated heat-resistant fibers (I) are contained, there is no hindrance to the control of the thickness of the separator and the cuttability of the separator, and the resistance of the separator rarely becomes worse. Since the fibrillated heat-resistant fibers (II) include relatively thick stem fibers remaining besides the fibrillated fine fibers, the compression resistance of the separator improves and the short-circuit resistance of the separator becomes high.

The content of the synthetic resin short fibers is preferably not less than 90.0 mass %, more preferably not less than 92 mass %, much more preferably not less than 94.0 mass %, particularly preferably more than 95.0 mass % based on the total of all the fiber components contained in the separator (2). The content is preferably not more than 98.0 mass %, more preferably not more than 97.0 mass %, much more preferably not more than 96.0 mass %. When the content of the synthetic resin short fibers is more than 98.0 mass %, though the tensile strength of the separator becomes high, the effect of improving a leakage current may become small in the case of a separator having a low basis weight. When the content of the synthetic resin short fibers is less than 90.0 mass % and the basis weight of the separator is reduced, mechanical strength becomes low, whereby the separator may be broken in the step of assembling a battery.

The most preferred separator (2) contains the fibrillated heat-resistant fibers (I) and (II) and the synthetic resin short fibers as fiber components. In this case, the content of the synthetic resin short fibers is preferably more than 91.0 mass % to not more than 98.0 mass % based on the total of all the fiber components contained in the separator of the present invention. The content is more preferably not more than 97.0 mass %, much more preferably not more than 96.0 mass %. It is more preferably more than 95.0 mass %.

The separator (3) of the present invention is characterized in that it contains heat-resistant fibers and synthetic resin short fibers, the fibrillated heat-resistant fibers (I) and the fibrid are contained as the heat-resistant fibers, and the total content of the fibrillated heat-resistant fibers (I) and the fibrid is not less than 1.0 mass % to less than 5.0 mass % based on the total of all the fiber components contained in the separator.

The content of the heat-resistant fibers having a modified freeness of not more than 300 ml, that is, the total content of the two different types of heat-resistant fibers, i.e., the fibrid having a modified freeness of not more than 300 ml and the fibrillated heat-resistant fibers (I) having a modified freeness of not more than 300 ml is not less than 1.0 mass % to less than 5.0 mass % based on the total of all the fiber components contained in the separator (3). The total content is preferably not less than 1.6 mass %, more preferably not less than 2.1 mass %, particularly preferably not less than 2.5 mass %. When the total content of the heat-resistant fibers is not less than 5.0 mass %, it is difficult to reduce the thickness of the separator. The internal resistance may become high. When the total content of the heat-resistant fibers is less than 1.0 mass %, though the tensile strength of the separator becomes high, the effect of improving the incidence of internal short circuit failure may become small in the case of a separator having a low basis weight.

In the heat-resistant fibers having a modified freeness of not more than 300 ml contained in the separator (3), the content of the fibrillated heat-resistant fibers (I) is preferably more than 50 mass %, more preferably not less than 60 mass %, much more preferably not less than 70 mass %, particularly preferably not less than 80 mass % based on the total of the fibrid and the fibrillated heat-resistant fibers (I). The content of the fibrillated heat-resistant fibers (I) is preferably not more than 92 mass %, more preferably not more than 88 mass %, much more preferably not more than 84 mass %.

In the separator (3), when the content of the fibrillated heat-resistant fibers (I) is more than 50 mass % and the fibrid and the fibrillated heat-resistant fibers (I) are used in combination, the separator can be made thin, there is no hindrance to the cuttability of the separator, the pore diameter becomes small, and the retainability of the electrolytic solution improves, whereby the resistance of the separator rarely becomes worse. The fibrid has a leaf-like fibrous form and greatly shrinks when moisture existent in the crystal structure is dried off and removed, thereby strengthening a network formed by the fibrillated heat-resistant fibers (I) and the synthetic resin short fibers. Therefore, even when the basis weight is low, the strength characteristics of the separator can be retained and the incidence of internal short circuit failure can be prevented from becoming worse.

When the content of the fibrillated heat-resistant fibers (I) is not more than 50 mass % in the separator (3) and the separator is made thin, the resistance may rise. When the content of the fibrillated heat-resistant fibers (I) is not more than 50 mass % and the basis weight of the separator is reduced, the strength characteristics of the separator may be hardly retained, and it may be difficult to prevent the incidence of internal short circuit failure from becoming worse. When the content of the fibrillated heat-resistant fibers (I) is more than 92 mass %, the tensile strength may lower or the resistance of the separator may become worse.

The content of the synthetic resin short fibers is preferably not less than 90.0 mass %, more preferably not less than 92.0 mass %, much more preferably not less than 94.0 mass %, particularly preferably more than 95.0 mass % based on the total of all the fiber components contained in the separator (3). The content is preferably not more than 99.0 mass %, more preferably not more than 98.0 mass %, much more preferably not more than 97.0 mass %. When the content of the synthetic resin short fibers is more than 99.0 mass %, though the tensile strength of the separator becomes high, the effect of improving the incidence of internal short circuit failure may become small. When the content of the synthetic resin short fibers is less than 90.0 mass % and the basis weight of the separator is reduced, mechanical strength becomes low, whereby the separator may be broken at the time of assembling a battery.

The most preferred separator (3) is a separator containing the fibrillated heat-resistant fibers (I), the fibrid and the synthetic resin short fibers as fiber components. In this case, the content of the synthetic resin short fibers is preferably 96.0 to 99.0 mass % based on the total of all the fiber components contained in the separator (3). The content is more preferably not more than 98.0 mass %, much more preferably not more than 97.0 mass %. It is particularly preferably not less than 96.5 mass %.

The separator (4) of the present invention is characterized in that it contains heat-resistant fibers and synthetic resin short fibers, the fibrillated heat-resistant fibers (I), the fibrillated heat-resistant fibers (II) and the fibrid are contained as the heat-resistant fibers, and the total content of the fibrillated heat-resistant fibers (I) and (II) and the fibrid is not less than 2.0 mass % to less than 9.0 mass % based on the total of all the fiber components contained in the separator.

In the present invention, the total content of the fibrid and the fibrillated heat-resistant fibers (I) and (II) is preferably not less than 2.0 mass % to less than 9.0 mass %, more preferably not less than 3.0 mass % to less than 9.0 mass %, much more preferably not less than 3.5 mass % to less than 7.0 mass %, particularly preferably not less than 3.5 mass % to less than 5.0 mass % based on the total of all the fiber components contained in the separator (4). When the total content of the fibrid and the two different types of fibrillated heat-resistant fibers (I) and (II) is not less than 9.0 mass %, it is difficult to reduce the thickness of the separator. Tensile strength may lower, and internal resistance may become worse. When the total content of the fibrid and the two different types of fibrillated heat-resistant fibers (I) and (II) is less than 2.0 mass %, though the tensile strength of the separator becomes high, the effect of improving the incidence of internal short circuit failure may become small.

The content of the fibrid is preferably not less than 0.4 mass % to less than 2.5 mass %, more preferably not less than 0.4 mass % to less than 2.0 mass %, much more preferably not less than 0.4 mass % to less than 1.5 mass %, particularly preferably not less than 0.4 mass % to less than 1.0 mass % based on the total of all the fiber components contained in the separator (4). When the fibrid is used in this range, though the fibrillated heat-resistant fibers (I) and (II) are contained, there is no hindrance to the control of the thickness of the separator and the cuttability of the separator, and the resistance of the separator rarely becomes worse. Further, the fibrid has a thin leaf-like fibrous form and greatly shrinks when moisture existent in the crystal structure is dried off and removed, thereby strengthening a network formed by the fibrillated heat-resistant fibers (I) and (II). Therefore, even when the basis weight is low, the strength characteristics of the separator can be retained and internal short circuit failure can be prevented, thereby improving the short-circuit resistance of the separator.

The content of the fibrillated heat-resistant fibers (II) is preferably not less than 1.0 mass % to less than 4.0 mass %, more preferably 1.0 to 3.0 mass %, much more preferably 1.0 to 2.0 mass %, particularly preferably 1.0 to 1.5 mass % based on the total of all the fiber components contained in the separator (4). When the fibrillated heat-resistant fibers (II) are used in this range, though the fibrid and the fibrillated heat-resistant fibers (I) are contained, there is no hindrance to the control of the thickness of the separator and the resistance of the separator rarely becomes worse. Since the fibrillated heat-resistant fibers (II) include relatively thick stem fibers remaining besides the fibrillated fine fibers, the compression resistance of the separator improves and the short-circuit resistance of the separator become high.

The content of the fibrillated heat-resistant fibers (I) is preferably not less than 0.6 mass % to less than 4.6 mass %, more preferably not less than 1.0 mass % to less than 4.6 mass %, much more preferably not less than 1.5 mass % to less than 4.0 mass %, particularly preferably 2.0 to 3.0 mass % based on the total of all the fiber components contained in the separator (4). When the fibrillated heat-resistant fibers (I) are used in this range, the number of thick stem fibers before the fibrillation of the heat-resistant fibers is small and the fibrillated fibers are fine, whereby there is no hindrance to the control of the thickness of the separator and the cuttability of the separator, and the pore diameter becomes small. Therefore, the retainability of the electrolytic solution becomes high, thereby producing the effect of improving the resistance of the separator. When the content of the fibrillated heat-resistant fibers (I) is not less than 4.6 mass %, tensile strength may lower, and the resistance of the separator may become worse. When the content of the fibrillated heat-resistant fibers (I) is less than 0.6 mass %, the effect obtained by blending the fibrillated heat-resistant fibers (I) may not be observed.

Even when the total content of the fibrid and the fibrillated heat-resistant fibers (I) and (II) is not less than 2.0 mass % to less than 9.0 mass % based on the total of all the fiber components contained in the separator (4), in the case of a total content of the fibrid and the fibrillated heat-resistant fibers (I) of not less than 5.0 mass %, internal resistance may become worse. In addition, when the content of the fibrid is not less than 2.5 mass % and the basis weight of the separator is low, internal resistance may become worse.

The content of the synthetic resin short fibers is preferably not less than 90.0 mass %, more preferably not less than 92.0 mass %, much more preferably not less than 93.0 mass %, particularly preferably more than 95.0 mass % based on the total of all the fiber components contained in the separator (4). The content is preferably not more than 98.0 mass %, more preferably not more than 97.5 mass %, much more preferably not more than 97.0 mass %, particularly preferably not more than 96.5 mass %. When the content of the synthetic resin short fibers is more than 98.0 mass %, though the tensile strength of the separator becomes high, the effect of improving the incidence of internal short circuit failure may become small. When the content of the synthetic resin short fibers is less than 90.0 mass % and the basis weight of the separator is reduced, mechanical strength becomes low, whereby the separator may be broken at the time of laminating an electrode or assembling a battery.

In the present invention, as the fibrillated heat-resistant fibers, fibers obtained by fibrillating heat-resistant fibers made of a heat-resistant resin such as wholly aromatic polyamide (aramid), wholly aromatic polyester, polyimide, polyamide imide, polyether ether ketone, polyphenylene sulfide, polybenzimidazole, poly-p-phenylene benzobisthiazole, poly-p-phenylene benzobisoxazole or polytetrafluoroethylene are used. Out of these, wholly aromatic polyamide is preferred as it has high affinity for an electrolytic solution and is easily fibrillated.

The fibrillated heat-resistant fibers can be obtained by processing heat-resistant fibers with a refiner, beater, mill, grinding machine, rotary homogenizer which applies shear force with a high-speed rotary blade, double cylinder type high-speed homogenizer which produces shear force between an cylindrical inner blade rotating at a high speed and a fixed outer blade, ultrasonic crusher which refines with ultrasonic shock, or high-pressure homogenizer which lets a fiber suspension pass through a small-diameter orifice by applying a pressure difference to accelerate the speed of the suspension and collides the fiber suspension to rapidly decelerate it so as to apply shear force and cutting force to the fibers.

In the present invention, the term "fibrid" refers to a thin leaf-like or flaky piece having fine fibrils and fine heat-resistant fiber in which a water molecule or moisture is existent in the crystal structure in an amorphous state without forming a strong fiber crystal structure. The fibrid is obtained by collecting a product obtained by introducing a fiber forming high-molecular weight polymer solution into an aqueous coagulation bath without drying it and fibrillating it by beating as required. It is, for example, a fibrid which is produced by mixing a polymer solution with a precipitating agent for it in the presence of shear force or an amorphous hydrous product having molecular orientation formed from a high-molecular weight polymer solution showing optical anisotropy and may be beaten as required.

The fibrid can be obtained by beating with a refiner, beater, mill, grinding machine, rotary homogenizer which applies shear force with a high-speed rotary blade, double cylinder type high-speed homogenizer which produces shear force between an cylindrical inner blade rotating at a high speed and a fixed outer blade, ultrasonic crusher which refines with ultrasonic shock, or high-pressure homogenizer which lets a fiber suspension pass through a small-diameter orifice by applying a pressure difference to accelerate the speed of the suspension and collides the fiber suspension to rapidly decelerate it so as to apply shear force and cutting force to the fibers.

In the present invention, when moisture existent in the crystal structure is removed by heating or pressure reduction, the fibrid greatly shrinks to strengthen the fiber network, thereby improving the strength characteristics of the separator.

The modified freeness of the fibrillated heat-resistant fibers (I) in the present invention is not more than 300 ml, preferably 0 to 200 ml, more preferably 0 to 100 ml. When the modified freeness of all the fibrillated heat-resistant fibers is more than 300 ml, a large number of thick stem fibers are existent, thereby making it difficult to control the thickness and deteriorating the cuttability of the separator. Since ion permeability is hindered and the retainability of the electrolytic solution is deteriorated by the existence of the thick stem fibers, the resistance of the separator becomes high. Further, since there is a great need to increase the load or temperature of a heat calender for the control of thickness, the fusion area of a binder fiber is widened and ion permeability is hindered, whereby the resistance of the separator may become high. When the modified freeness of all the fibrillated heat-resistant fibers is less than 0 ml, the fibrillation of the fibrillated heat-resistant fibers proceeds too much, whereby the number of fine fibers to be bonded by a predetermined amount of a binder fiber is increased and therefore, tensile strength may lower. When the fibrillation of the fibrillated heat-resistant fibers proceeds, the modified freeness keeps falling. When fibrillation further proceeds after the modified freeness reaches 0 ml, the fibers pass through the mesh, whereby the modified freeness begins to rise reversely. In the present invention, the state that the modified freeness begins to rise reversely is referred to as "modified freeness of less than 0 ml".

The modified freeness of the fibrillated heat-resistant fibers (II) in the present invention is more than 300 ml, preferably more than 300 ml to less than 700 ml, more preferably more than 300 ml to less than 600 ml, much more preferably more than 300 ml to less than 450 ml. When the modified freeness of the fibrillated heat-resistant fibers (II) is not less than 700 ml, fibrillation does not proceed much, whereby it is difficult to control the thickness of the separator and the cuttability of the separator may deteriorate due to the existence of a large number of thick stem fibers. Since ion permeability is hindered and the retainability of the electrolytic solution is deteriorated by the existence of the thick stem fibers, the internal resistance of the separator may become high.

In the present invention, the modified freeness of the fibrid is preferably 0 to 300 ml, more preferably 0 to 200 ml, much more preferably 0 to 100 ml. When the modified freeness of the fibrid is more than 300 ml, the fiber width of the fibrid becomes large and the internal resistance of the separator may become high. Further, the texture (density unevenness) of the separator becomes worse and the mechanical strength of the separator becomes low, whereby the separator may be broken at the time of assembling a battery. Further, the cuttability of the separator may deteriorate.

Preferably, the fibrillated heat-resistant fibers (I) have a mass-weighted average fiber length of 0.02 to 1.00 mm. The length-weighted average fiber length is preferably 0.02 to 0.50 mm. When the average fiber length is smaller than the preferred range, the fibrillated heat-resistant fibers may fall off from the separator. When the average fiber length is larger than the preferred range, the disintegration of the fibers deteriorates and a dispersion failure tends to occur.

Preferably, the fibrillated heat-resistant fibers (II) have a mass-weighted average fiber length of 1.00 to 1.50 mm. The length-weighted average fiber length is preferably 0.50 to 1.00 mm. When the average fiber length is smaller than the preferred range, the effect of improving short-circuit resistance becomes small. When the average fiber length is larger than the preferred range, it nay be difficult to reduce the thickness of the separator and cuttability may deteriorate.

Preferably, the fibrid has a mass-weighted average fiber length of 0.30 to 1.00 mm. The length-weighted average fiber length of the fibrid is preferably 0.10 to 0.50 mm. When the average fiber length is smaller than the preferred range, the fibrid may fall off from the separator. When the average fiber length is larger than the preferred range, the textile of the separator may become worse, the internal resistance of the separator may become high, and the incidence of internal short circuit failure may become worse.

When the fibrid has the above mass-weighted average fiber length and the above length-weighted average fiber length, if the content of the fibrid in the separator is low, a fine network structure is formed by the fibers between fibrids and between the fibrid and the synthetic resin short fibers, whereby a thin separator having high tensile strength is easily obtained without impairing cuttability.

When the mass-weighted average fiber lengths and the length-weighted average fiber lengths of the fibrillated heat-resistant fibers (I) and (II) and the fibrid fall within the above preferred ranges, if the contents of the fibrid and the fibrillated heat-resistant fibers in the separator are low, a fine network structure is formed by the fibers between the heat-resistant fibers and between the heat-resistant fibers and the synthetic resin short fibers, whereby a thin separator having high tensile strength is easily obtained without impairing cuttability. Further, a separator having low internal resistance, a low incidence of internal short circuit failure and high rate discharge characteristics is easily obtained.

In the present invention, the mass-weighted average fiber length and the length-weighted average fiber length are mass-weighted average fiber length (L(w)) and length-weighted average fiber length (L(I)) measured in a projection fiber length (Proj) mode with KajaaniFiberLab V3.5 (manufactured by Metso Automation), respectively.

The average fiber width of the fibrillated heat-resistant fibers (I) is preferably 0.5 to 20.0 µm, more preferably 3.0 to 16.0 µm, much more preferably 5.0 to 15.0 µm. When the average fiber width is larger than 20.0 µm, it may be difficult to reduce the thickness of the separator or cuttability may deteriorate. When the average fiber width is smaller than 0.5 µm, the fibrillated heat-resistant fibers (I) may fall off from the separator.

The average fiber width of the fibrillated heat-resistant fibers (II) is preferably 5.0 to 40.0 µm, more preferably 5.0 to 35.0 µm, much more preferably 5.0 to 30.0 µm. When the average fiber width is larger than 40.0 µm, it may be difficult to reduce the thickness of the separator or cuttability may deteriorate. When the average fiber width is smaller than 5.0 µm, short-circuit resistance may not improve.

The average fiber width of the fibrid is preferably 3.0 to 40.0 µm, more preferably 5.0 to 35.0 µm, much more preferably 10.0 to 30.0 µm. When the average fiber width is larger than 40.0 µm, the internal resistance of the separator tends to become high, it may be difficult to reduce the thickness, or cuttability may deteriorate. When the average fiber width is smaller than 3.0 µm, the fibrid beating time becomes long, thereby greatly reducing productivity.

In the present invention, the average fiber width of the fibrid is a fiber width measured by using KajaaniFiberLab V.3.5 (manufactured by Metso Automation).

In Examples of the present invention, the modified freeness, mass-weighted average fiber length, length-weighted average fiber length and average fiber width of the heat-resistant fibers are the measurement values (A) of raw materials before the manufacture of the separator. In the present invention, the measurement values (B) of the heat-resistant fibers taken out from the separator were obtained to check the differences between the measurement values (A) and the measurement values (B). A separator containing polyethylene terephthalate-based synthetic resin short fibers and the fibrillated heat-resistant fibers (I) was first put in an alkali-resistant plastic vessel. Then, a highly concentrated alkali solution (for example, a 48 mass % potassium hydroxide aqueous solution) was added to the vessel, and a stirrer was inserted into the vessel. Thereafter, the solution was stirred for one day while the vessel was immersed in a 40 to 60° C. hot bath to dissolve the PET-based synthetic resin short fibers completely. Then, the fibrillated heat-resistant fibers (I) in the vessel were filtered out with a filter, neutralized, rinsed fully and dried to obtain the fibrillated heat-resistant fibers (I) taken out from the separator. The modified freeness and others of the fibrillated heat-resistant fibers (I) taken out from the separator were measured as the measurement values (B). When the measurement values (A) before the manufacture of the separator were compared with the measurement values (B), there were not so much differences between the measurement values (A) and (B) and it could be confirmed that "measurement values (A)≈measurement values (B)".

<Measurement Values (A)>

| | |
|---|---|
| Modified freeness | 50 ml |
| Mass-weighted average fiber length | 0.58 mm |

-continued

| | |
|---|---|
| Length-weighted average fiber length | 0.33 mm |
| Average fiber width | 15.5 μm |

<Measurement Values (B)>

| | |
|---|---|
| Modified freeness | 49 ml |
| Mass-weighted average fiber length | 0.55 mm |
| Length-weighted average fiber length | 0.31 mm |
| Average fiber width | 16.1 μm |

In the present invention, the synthetic resin short fibers are short fibers (staples) which are not fibrillated and are made of a synthetic resin such as polyolefin, polyester, polyvinyl acetate, ethylene-vinyl acetate copolymer, polyamide, acryl, polyvinyl chloride, polyvinylidene chloride, polyvinyl ether, polyvinyl ketone, polyether, polyvinyl alcohol, diene, polyurethane, phenol, melamine, furan, urea, aniline, unsaturated polyester, fluorine, silicon or derivative thereof. The tensile strength and thrust strength of the separator can be enhanced by blending the synthetic resin short fibers.

The synthetic resin short fibers may be fibers (single fibers) made of a single resin or composite fibers made of two or more resins. The synthetic resin short fibers contained in the separator of the present invention may be of one type or two or more different types. Examples of the composite fibers include core-sheath, eccentric, side-by-side, sea-island, orange and multiple bimetal type composite fibers.

The fineness of the synthetic resin short fibers is preferably 0.01 to 0.6 dtex, more preferably 0.02 to 0.3 dtex. When the fineness of the synthetic resin short fibers is more than 0.6 dtex, the number of fibers in the thickness direction becomes small, whereby the pore size distribution of the separator becomes wide with the result that the incidence of internal short circuit failure becomes high. Further, it is difficult to reduce the thickness, and strength characteristics tend to deteriorate. When the fineness of the synthetic resin short fibers is less than 0.01 dtex, the fibers become very expensive, the stable production of the fibers may be difficult, and dewaterability may deteriorate at the time of producing a separator by a wet papermaking method.

The fiber length of the synthetic resin short fibers is preferably 1 to 10 mm, more preferably 1 to 5 mm. When the fiber length is larger than 10 mm, the texture may become worse. When the fiber length is smaller than 1 mm, the mechanical strength of the separator lowers, whereby the separator may be broken at the time of forming a battery.

The separator of the present invention may contain fibers other than the heat-resistant fibers and the synthetic resin short fibers. Examples of the fibers include cellulose fibers, pulp products and fibrillated products of cellulose fibers, pulp products of synthetic resins and inorganic fibers. The inorganic fibers include glass, alumina, silica, ceramic and Rockwool fibers. The cellulose fibers may be either natural cellulose fibers or regenerated cellulose fibers.

The thickness of the separator of the present invention is preferably not smaller than 10 μm, more preferably not smaller than 11 μm, much more preferably not smaller than 12 μm. Further, it is preferably not larger than 20 μm, more preferably not larger than 18 μm, much more preferably not larger than 15 μm. Even when the thickness of the separator is set to the above range, internal resistance can be reduced and tensile strength required for the electrode laminating step can be retained in the separator of the present invention, whereby work efficiency in each step including the paper-making property of the separator is not impaired. When the thickness of the separator is larger than 20 μm, the internal resistance of the separator may become too high. Further, a high capacity battery may not be obtained. When the thickness of the separator is smaller than 10 μm, the strength of the separator becomes too low, whereby the separator may be broken at the time of handling, laminating an electrode or assembling a battery.

The density of the lithium ion battery separator of the present invention is preferably not lower than 0.40 g/cm$^3$, more preferably not lower than 0.45 g/cm$^3$, and preferably not higher than 0.75 g/cm$^3$, more preferably not higher than 0.70 g/cm$^3$. When the density is lower than 0.40 g/cm$^3$, the strength of the separator becomes too low, whereby the separator may be broken at the time of handling or laminating an electrode. When the density is higher than 0.75 g/cm$^3$, the internal resistance of the separator may become too high.

The lithium ion battery separator of the present invention is preferably a wet nonwoven fabric produced by a wet paper-making method. The wet paper-making method is to produce the wet nonwoven fabric by dispersing fibers in water to prepare a homogeneous paper-making slurry and filtering the paper-making slurry with a paper machine. Examples of the paper machine include a cylinder paper machine, fourdrinier paper machine, inclination type paper machine, inclination short foundrinier paper machine (?) and composite machines thereof. In the process for producing the wet nonwoven fabric, a water-jet interlacing treatment may be carried out as required. As the treatment of the wet nonwoven fabric, a heat treatment, calendering or heat calendering may be carried out.

EXAMPLES

The following examples are provided for the purpose of further illustrating the present invention but are in noway to be taken as limiting. Percentages (%) and parts in Examples are all based on mass unless otherwise noted.

The following physical properties of the lithium ion battery separators of Examples and Comparative Examples were measured and evaluated.

<Basis Weight of Separator>

The basis weight of the separator was measured in accordance with JIS P8124.

<Thicknesses of Separator>

The thickness of the separator was measured under a load of 5 N by using an external micrometer specified in JIS B7502.

<Evaluation of Tensile Strength>

A sample piece measuring 250 mm in a flow direction×50 mm in a width direction was cut out from each separator in such a manner that its long side was arranged in the flow direction to carry out a tensile test at a tensile speed of 200 ram/min by using a desk-top material testing machine (STA-1150 of ORIENTEC Co., Ltd.) in accordance with JIS P8113. The maximum value of tensile stress is taken as "tensile strength". In general, higher tensile strength is more preferred. When tensile strength is low, tension applied to the separator must be precisely controlled at the time of manufacturing a battery, thereby causing a problem that a large-scaled apparatus is required for this control. When tensile strength is evaluated as Δ, the separator may be usable for practical application by precisely controlling tension applied to the separator.

⊚: tensile strength of not less than 800 N/m
○: tensile strength of not less than 600 N/m to less than 800 N/m
Δ: tensile strength of not less than 400 N/m to less than 600 N/m
X: tensile strength of less than 400 N/m <Cuttability of Separator>

Each separator having a width of 120 mm was melt-cut with a heat sealing apparatus to check the melt-down surface visually and evaluate it based on the following criteria.
○: no fluff is seen on melt-down surface
Δ: fluff is slightly seen on melt-down surface
X: fluff is striking on melt-down surface <Manufacture of Evaluation Battery>

A slurry was prepared by mixing together 95 mass % of lithium titanate having a spinel structure represented by $Li_4Ti_5O_{12}$ which had an average particle diameter of 0.7 μm and a Li absorption potential of 1.55 V as a negative electrode active material, 2.5 mass % of acetylene black as a conductive material and 2.5 mass % of polyvinylidene fluoride and dispersing the resulting mixture in N-methyl-2-pyrrolidone and coated to both sides of a 15 μm-thick aluminum foil which was then rolled and vacuum dried at 150° C. for 2 hours to manufacture a 100 μm-thick negative electrode for lithium ion secondary batteries.

A slurry was prepared by mixing together 90 mass % of lithium cobalt oxide ($LiCoO_2$) as a positive electrode active material, 3 mass % of acetylene black, 3 mass % of graphite and 4 mass % of polyvinylidene fluoride and dispersing the resulting mixture in N-methyl-2-pyrrolidone. This slurry was coated to both sides of a collector made of an aluminum foil having a thickness of 15 μm which was then rolled and vacuum dried at 150° C. for 2 hours to manufacture a 100 μm-thick positive electrode for lithium ion secondary batteries.

Terminals were connected to the collector of the positive electrode and the negative electrode, the positive electrode, the separator, the negative electrode and the separator were laminated together in the mentioned order, and the obtained laminate was wound in such a manner that the terminals of the positive electrode and the negative electrode were arranged perpendicular to the longitudinal direction of the separator. Subsequently, this wound laminate was thermally pressed at 90° C. to manufacture flat electrodes measuring 70 mm×100 mm and having a thickness of 3.0 mm. Then, a laminate film pack (bag-like exterior material) having a thickness of 0.1 mm which was composed of an aluminum foil having a thickness of 40 μm and a polyethylene film on both sides was prepared, and the obtained electrodes were stored in this bag-like exterior material in such a manner that the terminals of the negative electrode and the positive electrode projected outward from the opening of the exterior material and vacuum dried at 80° C. for 24 hours. After the above electrodes were stored and a solution prepared by dissolving 1.5 mol/L lithium tetrafluoroborate as an electrolyte in a mixed solvent of ethylene carbonate (EC) and γ-butyrolactone (BL) (volume ratio of 25:75) as an electrolytic solution was injected into the bag-like exterior material, the opening of the bag-like exterior material was completely sealed up by heat sealing to manufacture a lithium ion secondary battery.

<Evaluation of Resistance>

After the manufactured separator was immersed in an electrolytic solution (1M-$LiPF_6$/EC+diethyl carbonate (DEC)+dimethyl carbonate (DMC) (volume ratio of 1:1:1)), it was sandwiched between two substantially cylindrical copper electrodes to measure the resistance component of AC impedance at 200 kHz by using an LCR meter (LCR-821 of Instec).

<Incidence of Internal Short Circuit Failure>

After the electrodes were manufactured by winding the manufactured separator between electrodes made of aluminum foil, conduction between the electrodes was checked with a tester without impregnating the electrodes with the electrolytic solution to confirm the existence or nonexistence of a short circuit. The incidence of internal short circuit failure (%) was calculated from the number of short-circuited electrodes based on the total number of all electrodes by checking 200 electrodes.

<Cycle Characteristics>

A charging/discharging cycle test was carried out on each lithium ion secondary battery at a 1C rate in a 45° C. environment to measure discharge capacity at a 1,000-th cycle so as to calculate cycle characteristics as the discharge capacity retention ratio (%) to the discharge capacity at a 5-th cycle.

Examples 1

Example 1-1

55.5 parts by mass of oriented crystallized polyethylene terephthalate (PET)-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.) and 4.5 parts by mass of fibrillated heat-resistant fibers obtained by fibrillating a pulp-like product of wholly aromatic polyamide fibers (average fiber length of 1.7 mm, average fiber diameter of 10 μm) to a modified freeness of up to 50 ml with a high-pressure homogenizer were dispersed in water with a pulper to prepare a homogeneous paper-making slurry having a concentration of 0.5 mass %, and a wet paper web was obtained by using an inclination type paper machine and dried with a cylinder drier having a surface temperature of 135° C. to obtain a sheet. The obtained sheet was calendered with a heat calender having a steel roll plated with chromium and having a surface temperature of 195° C. as one of the rolls and a resin roll having a hardness of Shore D92 as the other roll and a linear pressure of 100 kN/m to produce a separator having a basis weight of 10 g/m² and a thickness of 15 μm.

Example 1-2

A separator having a basis weight of 10 g/m² and a thickness of 15 μm was manufactured in the same manner as in Example 1-1 except that 59.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm and 1.0 part by mass of fibrillated heat-resistant fibers having a modified freeness of 50 ml were used.

Example 1-3

A separator having a basis weight of 8 g/m² and a thickness of 11 μm was manufactured in the same manner as in Example 1-1 except that 55.1 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm and 4.9 parts by mass of fibrillated heat-resistant fibers having a modified freeness of 50 ml were used.

Example 1-4

A separator having a basis weight of 10 g/m$^2$ and a thickness of 15 μm was manufactured in the same manner as in Example 1-1 except that 55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm and 4.5 parts by mass of fibrillated heat-resistant fibers obtained by fibrillating cut fibers (average fiber length of 3.0 mm, average fiber diameter of 20 μm) of polyarylate fibers (wholly aromatic polyester fibers) to a modified freeness of up to 250 ml with a high-pressure homogenizer were used.

Comparative Example 1-1

A separator having a basis weight of 10 g/m$^2$ and a thickness of 15 μm was manufactured in the same manner as in Example 1-1 except that 60.0 parts by mass of oriented crystallized PET-based synthetic resin short fibers having a fineness of 0.06 dtex and a fiber length of 3 mm and 40.0 parts by mass of undrawn PET-based synthetic resin short fibers for single-component binders having a fineness of 0.2 dtex and a fiber length of 3 mm were used.

Comparative Example 1-2

A separator having a basis weight of 8 g/m$^2$ and a thickness of 11 μm was manufactured in the same manner as in Example 1-1 except that 54.9 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm and 5.1 parts by mass of fibrillated heat-resistant fibers having a modified freeness of 50 ml were used and hot calendering was carried out at a steel roll surface temperature of 195° C. and a linear pressure of 120 kN/m to make the separator uniform in thickness.

Comparative Example 1-3

A separator having a basis weight of 8 g/m$^2$ and a thickness of 11 μm was manufactured in the same manner as in Example 1-1 except that 50.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm and 10.0 parts by mass of fibrillated heat-resistant fibers having a modified freeness of 50 ml were used and hot calendering was carried out at a steel roll surface temperature of 195° C. and a linear pressure of 175 kN/m to make the separator uniform in thickness.

Comparative Example 1-4

A separator having a basis weight of 8 g/m$^2$ and a thickness of 11 μm was manufactured in the same manner as in Example 1-3 except that the fibrillated heat-resistant fibers were changed to wholly aromatic polyamide fibers which had been fibrillated to a modified freeness of up to 320 ml by using a grinding apparatus.

Example 1-5

A separator having a basis weight of 7 g/m$^2$ and a thickness of 10 μm was manufactured in the same manner as in Example 1-1 except that 54.5 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm and 4.5 parts by mass of fibrillated heat-resistant fibers having a modified freeness of 50 ml were used.

Comparative Example 1-5

A separator having a basis weight of 8 g/m$^2$ and a thickness of 11 μm was manufactured in the same manner as in Example 1-1 except that the paper-making slurry of Comparative Example 1-1 was used.

Example 1-6

A separator having a basis weight of 10 g/m$^2$ and a thickness of 15 μm was manufactured in the same manner as in Example 1-1 except that 50.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 4.5 parts by mass of fibrillated heat-resistant fibers and 5.5 parts by mass of beaten solvent spun cellulose fibers having a modified freeness of 90 ml obtained by refining solvent spun cellulose fibers having an average fiber diameter of 10 μm and a fiber length of 4 mm with a refiner were used.

Example 1-7

A separator having a basis weight of 10 g/m$^2$ and a thickness of 15 μm was manufactured in the same manner as in Example 1-1 except that 49.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 4.5 parts by mass of fibrillated heat-resistant fibers having a modified freeness of 50 ml and 6.5 parts by mass of beaten solvent spun cellulose fibers having a modified freeness of 90 ml were used.

Example 1-8

A separator having a basis weight of 7 g/m$^2$ and a thickness of 10 μm was manufactured in the same manner as in Example 1-1 except that 55.0 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm and 4.0 parts by mass of fibrillated heat-resistant fibers having a modified freeness of 50 ml were used.

Example 1-9

A separator having a basis weight of 7 g/m² and a thickness of 10 μm was manufactured in the same manner as in Example 1-1 except that 56.0 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm and 3.0 parts by mass of fibrillated heat-resistant fibers having a modified freeness of 50 ml were used.

Example 1-10

A separator having a basis weight of 12 g/m² and a thickness of 18 μm was manufactured in the same manner as in Example 1-1 except that the paper-making slurry of Example 1-8 was used.

Comparative Example 1-6

A separator having a basis weight of 12 g/m² and a thickness of 18 μm was manufactured in the same manner as in Example 1-1 except that the paper-making slurry of Comparative Example 1-3 was used and hot calendering was carried out at a steel roll surface temperature of 195° C. and a linear pressure of 120 kN/m to make the separator uniform in thickness.

TABLE 1

|  |  |  | Ex. 1-1 | Ex. 1-2 | Ex. 1-3 | Ex. 1-4 | Ex. 1-5 |
|---|---|---|---|---|---|---|---|
| Fiber blending | Oriented crystallized PET-based synthetic resin short fibers 0.06 dtex 3 mm | pbm | 55.5 | 59.0 | 55.1 | 55.5 | 54.5 |
|  | Undrawn PET-based synthetic resin short fibers 0.2 dtex 3 mm | pbm | 40.0 | 40.0 | 40.0 | 40.0 | 41.0 |
|  | Fibrillated heat-resistant fibers (I) | pbm | 4.5 | 1.0 | 4.9 | 4.5 | 4.5 |
|  | Beaten solvent spun cellulose fibers | pbm | 0.0 | 0.0 | 0.0 | 0.0 | 0.0 |
| Fibrillated heat-resistant fibers (I) | Modified freeness | ml | 50 | 50 | 50 | 250 | 50 |
|  | Mass-weighted average fiber length | mm | 0.58 | 0.58 | 0.58 | 0.82 | 0.58 |
|  | Length-weighted average fiber length | mm | 0.33 | 0.33 | 0.33 | 0.45 | 0.33 |
|  | Fiber width | μm | 15.5 | 15.5 | 15.5 | 19.5 | 15.5 |
|  | Linear pressure of heat calender | kN/m | 100 | 100 | 100 | 100 | 100 |
| Evaluation | Weight of separator | g/m² | 10 | 10 | 8 | 10 | 7 |
|  | Thickness of separator | μm | 15 | 15 | 11 | 15 | 10 |
|  | Tensile strength of separator | — | ⊚ | ⊚ | ⊚ | ⊚ | ⊚ |
|  | Cuttability of separator | — | ○ | ○ | ○ | ○ | ○ |
|  | Resistance component (impedance) | Ω | 0.55 | 0.55 | 050 | 0.54 | 0.45 |
|  | Incidence of internal short circuit failure | % | 0.0 | 0.0 | 0.0 | 0.0 | 0.0 |
|  | Cycle characteristics | % | 90 | 88 | 88 | 90 | 85 |

|  |  |  | Ex. 1-6 | Ex. 1-7 | Ex. 1-8 | Ex. 1-9 | Ex. 1-10 |
|---|---|---|---|---|---|---|---|
| Fiber blending | Oriented crystallized PET-based synthetic resin short fibers 0.06 dtex 3 mm | pbm | 50.0 | 49.0 | 55.0 | 56.0 | 55.0 |
|  | Undrawn PET-based synthetic resin short fibers 0.2 dtex 3 mm | pbm | 40.0 | 40.0 | 41.0 | 41.0 | 41.0 |
|  | Fibrillated heat-resistant fibers (I) | pbm | 4.5 | 4.5 | 4.0 | 3.0 | 4.0 |
|  | Beaten solvent spun cellulose fibers | pbm | 5.5 | 6.5 | 0.0 | 0.0 | 0.0 |
| Fibrillated heat-resistant fibers (I) | Modified freeness | ml | 50 | 50 | 50 | 50 | 50 |
|  | Mass-weighted average fiber length | mm | 0.58 | 0.58 | 0.58 | 0.58 | 0.58 |
|  | Length-weighted average fiber length | mm | 0.33 | 0.33 | 0.33 | 0.33 | 0.33 |
|  | Fiber width | μm | 15.5 | 15.5 | 15.5 | 15.5 | 15.5 |
|  | Linear pressure of hot calender | kN/m | 100 | 100 | 100 | 100 | 100 |
| Evaluation | Weight of separator | g/m² | 10 | 10 | 7 | 7 | 12 |
|  | Thickness of separator | μm | 15 | 15 | 10 | 10 | 18 |
|  | Tensile strength of separator | — | ⊚ | ○ | ⊚ | ⊚ | ⊚ |
|  | Cuttability of separator | — | ○ | ○ | ○ | ○ | ○ |
|  | Resistance component (impedance) | Ω | 0.50 | 0.49 | 0.45 | 0.45 | 0.56 |
|  | Incidence of internal short circuit failure | % | 0.0 | 0.0 | 0.0 | 0.0 | 0.0 |
|  | Cycle characteristics | % | 90 | 90 | 83 | 80 | 90 |

Ex.: Example
pbm: part by mass

TABLE 2

| | | | C. Ex. 1-1 | C. Ex. 1-2 | C. Ex. 1-3 | C. Ex. 1-4 | C. Ex. 1-5 | C. Ex. 1-6 |
|---|---|---|---|---|---|---|---|---|
| Fiber blending | Oriented crystallized PET-based synthetic resin short fibers 0.06 dtex 3 mm | pbm | 60.0 | 54.9 | 50.0 | 55.1 | 60.0 | 50.0 |
| | Undrawn PET-based synthetic resin short fibers 0.2 dtex 3 mm | pbm | 40.0 | 40.0 | 40.0 | 40.0 | 40.0 | 40.0 |
| | Fibrillated heat-resistant fibers (I) | pbm | 0.0 | 5.1 | 10.0 | 4.9 | 0.0 | 10.0 |
| | Beaten solvent spun cellulose fibers | pbm | 0.0 | 0.0 | 0.0 | 0.0 | 0.0 | 0.0 |
| Fibrillated heat-resistant fibers (I) | Modified freeness | ml | — | 50 | 50 | 320 | — | 50 |
| | Mass-weighted average fiber length | mm | — | 0.58 | 0.58 | 1.30 | — | 0.58 |
| | Length-weighted average fiber length | mm | — | 0.33 | 0.33 | 0.59 | — | 0.33 |
| | Fiber width | μm | — | 15.5 | 15.5 | 25.2 | — | 15.5 |
| | Linear pressure of hot calender | kN/m | 100 | 120 | 175 | 100 | 100 | 120 |
| Evaluation | Weight of separator | g/m$^2$ | 10 | 8 | 8 | 8 | 8 | 12 |
| | Thickness of separator | μm | 15 | 11 | 11 | 11 | 11 | 18 |
| | Tensile strength of separator | — | — | ◎ | ○ | Δ | ◎ | ◎ | Δ |
| | Cuttability of separator | | — | ○ | Δ | X | Δ | ○ | X |
| | Resistance component (impedance) | Ω | 0.54 | 0.58 | 0.65 | 0.55 | 0.47 | 0.58 |
| | Incidence of internal short circuit failure | % | 0.5 | 0.0 | 0.0 | 0.5 | 1.0 | 0.0 |
| | Cycle characteristics | % | 85 | 80 | 75 | 85 | 70 | 80 |

C. Ex.: Comparative Example
pbm: part by mass

The separators manufactured in Examples 1-1 to 1-10 contained fibrillated heat-resistant fibers (fibrillated heat-resistant fibers (I)) and synthetic resin short fibers, and the content of the fibrillated heat-resistant fibers (I) was not less than 1.0 mass to less than 5.0 mass % based on the total of all the fiber components contained in the separator. The separators of Examples 1-1 to 1-10 were excellent in tensile strength and cuttability. Further, they had a low impedance as a resistance component and a low incidence of internal short circuit failure. Especially the separators of Examples 1-1 to 1-9 were excellent in cycle characteristics though they had a small thickness of not more than 15 μm.

The separators of Examples 1-6 and 1-7 contained fibers other than the fibrillated heat-resistant fibers (I) and the synthetic resin short fibers. From comparison between Example 1-6 and Example 1-7, the separator of Example 1-6 having a content of the synthetic resin short fibers of not less than 90.0 mass % was superior in strength characteristics.

Since the separators of Comparative Examples 1-1 and 1-5 did not contain the fibrillated heat-resistant fibers (I), when the basis weight of the separator was reduced, internal short circuit failure was apt to occur.

The separators of Comparative Examples 1-2 and 1-3 contained the fibrillated heat-resistant fibers (I) and the synthetic resin short fibers, and the content of the fibrillated heat-resistant fibers (I) was not less than 5.0 mass % based on the total of all the fiber components contained in the separator. Therefore, tensile strength lowered and fluff remained on the melt-down surface in the evaluation of cuttability. Further, it was found that the linear pressure had to be raised to control the thickness of the separator to a predetermined value by hot calendering, thereby making it difficult to reduce the thickness of the separator. As a result, the impedance indicative of the resistance of the separator became high. In Comparative Example 1-3, as tensile strength lowered, the separator shrank in width or was broken as it was difficult to control tension in the step of laminating an electrode.

Since the modified freeness of the fibrillated heat-resistant fibers of the separator of Comparative Example 1-4 exceeded 300 ml, cuttability was low and fluff was slightly seen on the melt-down surface. Since the degree of fibrillation was low, the incidence of internal short circuit failure was apt to become worse when the basis weight of the separator was low.

Although the separators of Examples 1-10 and Comparative Example 1-6 had the same thickness of 18 μm, the content of the fibrillated heat-resistant fibers (I) was 4.0 mass % in the separator of Example 1-10 and 10.0 mass % in the separator of Comparative Example 1-6. In the case of a thick separator, even when the content of the fibrillated heat-resistant fibers (I) was not less than 5.0 mass %, the resistance component was not high. Although the separators of Example 1-8 and Comparative Example 1-3 had a thickness of 10 to 11 μm, the content of the fibrillated heat-resistant fibers (I) was 4.0 mass % in the separator of Example 1-8 and 10.0 mass % in the separator of Comparative Example 1-3. In the case of a thin separator, as the content of the fibrillated heat-resistant fibers (I) was less than 5.0 mass %, internal resistance was low.

Examples 2

Example 2-1

55.5 parts by mass of oriented crystallized polyethylene terephthalate (PET)-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.), 1.0 part by mass of fibrillated heat-resistant fibers obtained by fibrillating a pulp-like product of wholly aromatic polyamide fibers (average fiber length of 1.7 mm, average fiber diameter of 10 μm) to a modified freeness of up to 350 ml with a high-pressure homogenizer and 3.5 parts by mass of fibrillated heat-resistant fibers obtained by fibrillating a pulp-like product of wholly aromatic polyamide fibers to a modified freeness of up to 50 ml with a high-pressure homogenizer were dispersed in water with a pulper to prepare a homogeneous papermaking slurry having a concentration of 0.5 mass %, and a wet paper web was obtained by using an inclination type paper machine and dried with a cylinder drier having a surface temperature of 135° C. to obtain a sheet. The obtained sheet was calendered with a hot calender having a steel roll plated with chromium and having a surface temperature of 195° C. as one of the rolls and a resin roll having a hardness of Shore D92 as the other roll and a linear pressure of 100 kN/m to manufacture a separator having a basis weight of 10 g/m$^2$ and a thickness of 15 μm.

Example 2-2

A separator having a basis weight of 10 g/m$^2$ and a thickness of 15 μm was manufactured in the same manner as in Example 2-1 except that 55.5 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm, 3.5 parts by mass of fibrillated wholly aromatic polyamide fibers having a modified freeness of 350 ml and 1.0 part by mass of fibrillated wholly aromatic polyamide fibers having a modified freeness of 50 ml were used.

Example 2-3

A separator having a basis weight of 10 g/m$^2$ and a thickness of 15 μm was manufactured in the same manner as in Example 2-1 except that 58.0 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm, 1.0 part by mass of fibrillated wholly aromatic polyamide fibers having a modified freeness of 350 ml and 1.0 part by mass of fibrillated wholly aromatic polyamide fibers having a modified freeness of 50 ml were used.

Example 2-4

A separator having a basis weight of 9 g/m$^2$ and a thickness of 13 μm was manufactured in the same manner as in Example 2-1 except that 54.0 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm, 2.5 parts by mass of fibrillated wholly aromatic polyamide fibers having a modified freeness of 350 ml and 3.5 parts by mass of fibrillated wholly aromatic polyamide fibers having a modified freeness of 50 ml were used.

Example 2-5

A separator having a basis weight of 7 g/m$^2$ and a thickness of 10 μm was manufactured in the same manner as in Example 2-1 except that 50.2 parts by mass of oriented crystallized PET-based synthetic resin short fibers having a fineness of 0.06 dtex and a fiber length of 3 mm, 41.0 parts by mass of undrawn PET-based synthetic resin short fibers for binders having a fineness of 0.2 dtex and a fiber length of 3 mm, 3.9 parts by mass of fibrillated wholly aromatic polyamide fibers having a modified freeness of 350 ml and 4.9 parts by mass of fibrillated wholly aromatic polyamide fibers having a modified freeness of 50 ml were used and hot calendering was carried out at a steel roll surface temperature of 195° C. and a linear pressure of 115 kN/m to make the separator uniform in thickness.

Example 2-6

A separator having a basis weight of 7 g/m$^2$ and a thickness of 10 μm was manufactured in the same manner as in Example 2-1 except that 53.0 parts by mass of oriented crystallized PET-based synthetic resin short fibers having a fineness of 0.06 dtex and a fiber length of 3 mm, 41.0 parts by mass of undrawn PET-based synthetic resin short fibers for binders having a fineness of 0.2 dtex and a fiber length of 3 mm, 2.5 parts by mass of fibrillated wholly aromatic polyamide fibers having a modified freeness of 350 ml and 3.5 parts by mass of fibrillated polyarylate fibers obtained by fibrillating cut fibers (average fiber length of 3.0 mm, average fiber diameter of 20 μm) of polyarylate fibers (wholly aromatic polyester fibers) to a modified freeness of up to 250 ml with a high-pressure homogenizer were used.

Example 2-7

A separator having a basis weight of 7 g/m$^2$ and a thickness of 10 μm was manufactured in the same manner as in Example 2-1 except that 51.5 parts by mass of oriented crystallized PET-based synthetic resin short fibers having a fineness of 0.06 dtex and a fiber length of 3 mm, 41.0 parts by mass of undrawn PET-based synthetic resin short fibers for binders having a fineness of 0.2 dtex and a fiber length of 3 mm, 2.5 parts by mass of fibrillated wholly aromatic polyamide fibers having a modified freeness of 350 ml and 5.0 parts by mass of fibrillated wholly aromatic polyamide fibers having a modified freeness of 50 ml were used and hot calendering was carried out at a steel roll surface temperature of 195° C. and a linear pressure of 120 kN/m to make the separator uniform in thickness.

Example 2-8

A separator having a basis weight of 7 g/m$^2$ and a thickness of 10 μm was manufactured in the same manner as in Example 2-1 except that 51.5 parts by mass of oriented crystallized PET-based synthetic resin short fibers having a fineness of 0.06 dtex and a fiber length of 3 mm, 41.0 parts by mass of undrawn PET-based synthetic resin short fibers for binders having a fineness of 0.2 dtex and a fiber length of 3 mm, 4.0 parts by mass of fibrillated wholly aromatic polyamide fibers having a modified freeness of 350 ml and 3.5 parts by mass of fibrillated heat-resistant fibers having a modified freeness of 50 ml were used and hot calendering was carried out at a steel roll surface temperature of 195° C. and a linear pressure of 125 kN/m to make the separator uniform in thickness.

Example 2-9

A separator having a basis weight of 9 g/m$^2$ and a thickness of 13 μm was manufactured in the same manner as in Example 2-1 except that 50.0 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm, 3.5 parts by mass of fibrillated wholly aromatic polyamide fibers having a modified freeness of 350 ml, 4.5 parts by mass of fibrillated wholly aromatic polyamide fibers having a modified freeness of 50 ml and 2.0 parts by mass of beaten solvent spun cellulose fibers having a modified freeness of 90 ml obtained by refining solvent spun cellulose fibers having an average fiber diameter of 10 μm and a fiber length of 4 mm with a refiner were used.

Example 2-10

A separator having a basis weight of 9 g/m² and a thickness of 13 μm was manufactured in the same manner as in Example 2-1 except that 49.0 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm, 3.5 parts by mass of fibrillated wholly aromatic polyamide fibers having a modified freeness of 350 ml, 4.5 parts by mass of fibrillated wholly aromatic polyamide fibers having a modified freeness of 50 ml and 3.0 parts by mass of beaten solvent spun cellulose fibers having a modified freeness of 90 ml obtained by refining solvent spun cellulose fibers having an average fiber diameter of 10 μm and a fiber length of 4 mm with a refiner were used.

Comparative Example 2-1

A separator having a basis weight of 10 g/m² and a thickness of 15 μm was manufactured in the same manner as in Example 2-1 except that 60.0 parts by mass of oriented crystallized PET-based synthetic resin short fibers having a fineness of 0.06 dtex and a fiber length of 3 mm and 40.0 parts by mass of undrawn PET-based synthetic resin short fibers for binders having a fineness of 0.2 dtex and a fiber length of 3 mm were used.

Comparative Example 2-2

A separator having a basis weight of 7 g/m² and a thickness of 10 μm was manufactured in the same manner as in Example 2-1 except that hot calendering was carried out at a steel roll surface temperature of 195° C. and a linear pressure of 90 kN/m by using the papermaking slurry of Comparative Example 2-1 to make the separator uniform in thickness.

Comparative Example 2-3

A separator having a basis weight of 7 g/m² and a thickness of 10 μm was manufactured in the same manner as in Example 2-1 except that 50.1 parts by mass of oriented crystallized PET-based synthetic resin short fibers having a fineness of 0.06 dtex and a fiber length of 3 mm, 41.0 parts by mass of undrawn PET-based synthetic resin short fibers for binders having a fineness of 0.2 dtex and a fiber length of 3 mm and 8.9 parts by mass of fibrillated wholly aromatic polyamide fibers having a modified freeness of 350 ml were used and hot calendering was carried out at a steel roll surface temperature of 195° C. and a linear pressure of 175 kN/m to make the separator uniform in thickness.

Comparative Example 2-4

A separator having a basis weight of 7 g/m² and a thickness of 10 μm was manufactured in the same manner as in Example 2-1 except that 50.1 parts by mass of oriented crystallized PET-based synthetic resin short fibers having a fineness of 0.06 dtex and a fiber length of 3 mm, 41.0 parts by mass of undrawn PET-based synthetic resin short fibers for binders having a fineness of 0.2 dtex and a fiber length of 3 mm and 8.9 parts by mass of fibrillated heat-resistant fibers having a modified freeness of 50 ml were used and hot calendering was carried out at a steel roll surface temperature of 195° C. and a linear pressure of 160 kN/m to make the separator uniform in thickness.

Comparative Example 2-5

A separator having a basis weight of 7 g/m² and a thickness of 10 μm was manufactured in the same manner as in Example 2-1 except that 50.0 parts by mass of oriented crystallized PET-based synthetic resin short fibers having a fineness of 0.06 dtex and a fiber length of 3 mm, 40.8 parts by mass of undrawn PET-based synthetic resin short fibers for binders having a fineness of 0.2 dtex and a fiber length of 3 mm, 4.1 parts by mass of fibrillated wholly aromatic polyamide fibers having a modified freeness of 350 ml and 5.1 parts by mass of fibrillated heat-resistant fibers having a modified freeness of 50 ml were used and hot calendering was carried out at a steel roll surface temperature of 195° C. and a linear pressure of 140 kN/m to make the separator uniform in thickness.

TABLE 3

|  |  |  | Ex. 2-1 | Ex. 2-2 | Ex. 2-3 | Ex. 2-4 | Ex. 2-5 |
|---|---|---|---|---|---|---|---|
| Fiber blending | Oriented crystallized PET-based synthetic resin short fibers 0.06 dtex 3 mm | pbm | 55.5 | 55.5 | 58.0 | 54.0 | 50.2 |
|  | Undrawn PET-based synthetic resin short fibers 0.2 dtex 3 mm | pbm | 40.0 | 40.0 | 40.0 | 40.0 | 41.0 |
|  | Fibrillated heat-resistant fibers (II) having a modified freeness of more than 300 ml | pbm | 1.0 | 3.5 | 1.0 | 2.5 | 3.9 |
|  | Fibrillated heat-resistant fibers (I) having a modified freeness of not more than 300 ml | pbm | 3.5 | 1.0 | 1.0 | 3.5 | 4.9 |
|  | Beaten solvent spun cellulose fibers | pbm | 0.0 | 0.0 | 0.0 | 0.0 | 0.0 |
| Fibrillated heat-resistant fibers (II) | Modified freeness | ml | 350 | 350 | 350 | 350 | 350 |
|  | Mass-weighted average fiber length | mm | 1.30 | 1.30 | 1.30 | 1.30 | 1.30 |
|  | Length-weighted average fiber length | mm | 0.59 | 0.59 | 0.59 | 0.59 | 0.59 |
|  | Fiber width | μm | 25.2 | 25.2 | 25.2 | 25.2 | 25.2 |

TABLE 3-continued

| | | | | | | | |
|---|---|---|---|---|---|---|---|
| Fibrillated heat-resistant fibers (I) | Modified freeness | ml | 50 | 50 | 50 | 50 | 50 |
| | Mass-weighted average fiber length | mm | 0.58 | 0.58 | 0.58 | 0.58 | 0.58 |
| | Length-weighted average fiber length | mm | 0.33 | 0.33 | 0.33 | 0.33 | 0.33 |
| | Fiber width | μm | 15.5 | 15.5 | 15.5 | 15.5 | 15.5 |
| | Linear pressure of hot calender | kN/m | 100 | 100 | 100 | 100 | 115 |
| Evaluation | Weight of separator | g/m² | 10 | 10 | 10 | 9 | 7 |
| | Thickness of separator | μm | 15 | 15 | 15 | 13 | 10 |
| | Tensile strength of separator | — | ◎ | ◎ | ◎ | ◎ | ○ |
| | Cuttability of separator | — | ○ | ○ | ○ | ○ | ○ |
| | Resistance component (impedance) | Ω | 0.55 | 0.57 | 0.54 | 0.52 | 0.47 |
| | Incidence of internal short circuit failure | % | 0.0 | 0.0 | 0.0 | 0.0 | 0.0 |
| | Cycle characteristics | % | 90 | 88 | 88 | 90 | 85 |

| | | | Ex. 2-6 | Ex. 2-7 | Ex. 2-8 | Ex. 2-9 | Ex. 2-10 |
|---|---|---|---|---|---|---|---|
| Fiber blending | Oriented crystallized PET-based synthetic resin short fibers 0.06 dtex 3 mm | pbm | 53.0 | 51.5 | 51.5 | 50.0 | 49.0 |
| | Undrawn PET-based synthetic resin short fibers 0.2 dtex 3 mm | pbm | 41.0 | 41.0 | 41.0 | 40.0 | 40.0 |
| | Fibrillated heat-resistant fibers (II) having a modified freeness of more than 300 ml | pbm | 2.5 | 2.5 | 4.0 | 3.5 | 3.5 |
| | Fibrillated heat-resistant fibers (I) having a modified freeness of not more than 300 ml | pbm | 3.5 | 5.0 | 3.5 | 4.5 | 4.5 |
| | Beaten solvent spun cellulose fibers | pbm | 0.0 | 0.0 | 0.0 | 2.0 | 3.0 |
| Fibrillated heat-resistant fibers (II) | Modified freeness | ml | 350 | 350 | 350 | 350 | 350 |
| | Mass-weighted average fiber length | mm | 1.30 | 1.30 | 1.30 | 1.30 | 1.30 |
| | Length-weighted average fiber length | mm | 0.59 | 0.59 | 0.59 | 0.59 | 0.59 |
| | Fiber width | μm | 25.2 | 25.2 | 25.2 | 25.2 | 25.2 |
| Fibrillated heat-resistant fibers (I) | Modified freeness | ml | 250 | 50 | 50 | 50 | 50 |
| | Mass-weighted average fiber length | mm | 0.82 | 0.58 | 0.58 | 0.58 | 0.58 |
| | Length-weighted average fiber length | mm | 0.45 | 0.33 | 0.33 | 0.33 | 0.33 |
| | Fiber width | μm | 19.5 | 15.5 | 15.5 | 15.5 | 15.5 |
| | Linear pressure of hot calender | kN/m | 100 | 120 | 125 | 100 | 100 |
| Evaluation | Weight of separator | g/m² | 7 | 7 | 7 | 9 | 9 |
| | Thickness of separator | μm | 10 | 10 | 10 | 13 | 13 |
| | Tensile strength of separator | — | ○ | ○ | ○ | ○ | Δ |
| | Cuttability of separator | — | ○ | ○ | Δ | ○ | ○ |
| | Resistance component (impedance) | Ω | 0.45 | 0.49 | 0.50 | 0.50 | 0.49 |
| | Incidence of internal short circuit failure | % | 0.0 | 0.0 | 0.0 | 0.0 | 0.0 |
| | Cycle characteristics | % | 85 | 85 | 85 | 90 | 90 |

Ex.: Example
pbm: part by mass

TABLE 4

| | | | C. Ex. 2-1 | C. Ex. 2-2 | C. Ex. 2-3 | C. Ex. 2-4 | C. Ex. 2-5 |
|---|---|---|---|---|---|---|---|
| Fiber blending | Oriented crystallized PET-based synthetic resin short fibers 0.06 dtex 3 mm | pbm | 60.0 | 60.0 | 50.1 | 50.1 | 50.0 |
| | Undrawn PET-based synthetic resin short fibers 0.2 dtex 3 mm | pbm | 40.0 | 40.0 | 41.0 | 41.0 | 40.8 |
| | Fibrillated heat-resistant fibers (II) having a modified freeness of more than 300 ml | pbm | 0.0 | 0.0 | 8.9 | 0.0 | 4.1 |
| | Fibrillated heat-resistant fibers (I) having a modified freeness of not more than 300 ml | pbm | 0.0 | 0.0 | 0.0 | 8.9 | 5.1 |
| | Beaten solvent spun cellulose fibers | pbm | 0.0 | 0.0 | 0.0 | 0.0 | 0.0 |
| Fibrillated heat-resistant fibers (II) | Modified freeness | ml | — | — | 350 | — | 350 |
| | Mass-weighted average fiber length | mm | — | — | 1.30 | — | 1.30 |
| | Length-weighted average fiber length | mm | — | — | 0.59 | — | 0.59 |
| | Fiber width | μm | — | — | 25.2 | — | 25.2 |
| Fibrillated heat-resistant fibers (I) | Modified freeness | ml | — | — | — | 50 | 50 |
| | Mass-weighted average fiber length | mm | — | — | — | 0.58 | 0.58 |
| | Length-weighted average fiber length | mm | — | — | — | 0.33 | 0.33 |
| | Fiber width | μm | — | — | — | 15.5 | 15.5 |
| | Linear pressure of hot calender | kN/m | 100 | 90 | 175 | 160 | 140 |
| Evaluation | Weight of separator | g/m² | 10 | 7 | 7 | 7 | 7 |
| | Thickness of separator | μm | 15 | 10 | 10 | 10 | 10 |
| | Tensile strength of separator | — | ◎ | ○ | Δ | Δ | Δ |
| | Cuttability of separator | — | ○ | ○ | X | X | X |

TABLE 4-continued

|  |  | C. Ex. 2-1 | C. Ex. 2-2 | C. Ex. 2-3 | C. Ex. 2-4 | C. Ex. 2-5 |
|---|---|---|---|---|---|---|
| Resistance component (impedance) | Ω | 0.54 | 0.39 | 0.73 | 0.60 | 0.58 |
| Incidence of internal short circuit failure | % | 0.5 | 1.5 | 0.0 | 0.0 | 0.0 |
| Cycle characteristics | % | 85 | 70 | 65 | 70 | 75 |

C. Ex.: Comparative Example
pbm: part by mass

The separators manufactured in Examples 2-1 to 2-10 contained fibrillated heat-resistant fibers and synthetic resin short fibers, and the total content of the fibrillated heat-resistant fibers having a modified freeness of more than 300 ml (fibrillated heat-resistant fibers (II)) and the fibrillated heat-resistant fibers having a modified freeness of not more than 300 ml (fibrillated heat-resistant fibers (I)) was not less than 2.0 mass % to less than 9.0 mass % based on the total of all the fiber components contained in the separator. The separators of Examples 2-1 to 2-10 were excellent in tensile strength and cuttability. They had a low impedance as a resistance component and a low incidence of internal short circuit failure and were excellent in cycle characteristics though they had a small thickness of not more than 15 μm.

Out of the separators manufactured in Examples 2-1 to 2-10, the separators of Examples 2-1 to 2-6 and Examples 2-9 and 2-10 which had a total content of the fibrillated heat-resistant fibers (I) and the fibrillated heat-resistant fibers (II) of not less than 2.0 mass % to less than 9.0 mass %, a content of the fibrillated heat-resistant fibers (II) of not less than 1.0 mass % to less than 4.0 mass % and a content of the fibrillated heat-resistant fibers (I) of not less than 1.0 mass % to less than 5.0 mass % were excellent in curability.

Out of the separators manufactured in Examples 2-1 to 2-10, the separator of Example 2-7 contained the fibrillated heat-resistant fibers (I), the fibrillated heat-resistant fibers (II) and the synthetic resin short fibers and had a total content of the fibrillated heat-resistant fibers (I) and the fibrillated heat-resistant fibers (II) of not less than 2.0 mass % to less than 9.0 mass % and a content of the fibrillated heat-resistant fibers (I) of not less than 5.0 mass % based on the total of all the fiber components contained in the separator. Therefore, in the evaluation of cuttability, fluff slightly remained on the edge surface, and it was found that the linear pressure had to be raised at the time of controlling the thickness of the separator to a predetermined value by hot calendering, thereby making it difficult to reduce the thickness of the separator. As a result, the impedance indicative of the resistance component of the separator was the same as that of a separator having a basis weight of 9 g/m² though the basis weight of the separator was 7 g/m².

Out of the separators manufactured in Examples 2-1 to 2-10, the separator of Example 2-8 contained the fibrillated heat-resistant fibers (I), the fibrillated heat-resistant fibers (II) and the synthetic resin short fibers and had a total content of the fibrillated heat-resistant fibers (I) and the fibrillated heat-resistant fibers (II) of not less than 2.0 mass % to less than 9.0 mass % but a content of the fibrillated heat-resistant fibers (II) of not less than 4.0 mass % based on the total of all the fiber components contained in the separator. From comparison between Example 2-5 and Example 2-8, when the fibrillated heat-resistant fibers (II) were contained in an amount of not less than 4.0 mass %, a large number of thick stem fibers remained, whereby a large amount of fluff remained on the edge surface in the evaluation of cuttability. Further, it was found that the linear pressure had to be raised at the time of controlling the thickness of the separator to a predetermined value by hot calendering, thereby making it difficult to reduce the thickness of the separator. As a result, the impedance indicative of the resistance component of the separator was the same as that of a separator having a basis weight of 9 g/m² though the basis weight of the separator was 7 g/m².

Out of the separators manufactured in Examples 2-1 to 2-10, the separators of Examples 2-9 and 2-10 contained fibers other than the fibrillated heat-resistant fibers (I) and (II) and the synthetic resin short fibers. From comparison between Example 2-9 and Example 2-10, the separator of Example 2-9 having a content of the synthetic resin short fibers of not less than 90.0 mass % was superior in strength characteristics to the separator of Example 2-10 having a content of the synthetic resin short fibers of less than 90.0 mass %.

Since the separators of Comparative Examples 2-1 and 2-2 did not contain fibrillated heat-resistant fibers, when the basis weight of the separator was reduced, internal short circuit failure was apt to occur. Although the separators of Examples 2-1 to 2-3 had the same basis weight and the same thickness as the separator of Comparative Example 2-1, the cycle characteristics of Comparative Example 2-1 deteriorated. Although the separators of Examples 2-5 to 2-8 had the same basis weight and the same thickness as the separator of Comparative Example 2-2, the cycle characteristics of Comparative Example 2-2 deteriorated as well.

The separators of Comparative Examples 2-3 contained only the fibrillated heat-resistant fibers (II), the separator of Comparative Example 2-4 contained only the fibrillated heat-resistant fibers (I) as the heat-resistant fibers, and both of the separators had a content of the fibrillated heat-resistant fibers of 8.9 mass %. Although the content of the fibrillated heat-resistant fibers was not less than 2.0 mass % to less than 9.0 mass %, when the separator contained only one of the two different types of fibrillated heat-resistant fibers, tensile strength lowered and fluff remained on the edge surface in the evaluation of cuttability. Further, it was found that the linear pressure had to be raised at the time of controlling the thickness of the separator to a predetermined value by hot calendering, thereby making it difficult to reduce the thickness of the separator. As a result, the impedance indicative of the resistance component and cycle characteristics of the separator deteriorated.

The separator of Comparative Example 2-5 had a total content of the fibrillated heat-resistant fibers (II) and the fibrillated heat-resistant fibers (I) of not less than 9.0 mass %, a content of the fibrillated heat-resistant fibers (II) of not less than 4.0 mass % and a content of the fibrillated heat-resistant fibers (I) of not less than 5.0 mass % based on the total of all the fiber components contained in the separator. In this case, tensile strength lowered and a large amount of fluff remained on the edge surface in the evaluation of cuttability. Further, it was found that the linear pressure had to be raised at the time of controlling the thickness of the separator to a predetermined value by hot calendering, thereby making it difficult to reduce the thickness of the separator. As a result, the impedance indicative of the resistance component and cycle characteristics of the separator deteriorated.

Examples 3

Example 3-1

55.5 parts by mass of oriented crystallized polyethylene terephthalate (PET)-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.), 1.0 part by mass of a fibrid made of para-aromatic polyamide having a modified freeness of 88 ml obtained by defibrating and beating with a high-speed homogenizer and 3.5 parts by mass of fibrillated heat-resistant fibers obtained by fibrillating a pulp-like product of para-aromatic polyamide fibers to a modified freeness of up to 50 ml with a high-pressure homogenizer as heat-resistant fibers were dispersed in water with a pulper to prepare a homogeneous papermaking slurry having a concentration of 0.1 mass %, and a wet paper web was obtained by using an inclination type paper machine and dried with a cylinder drier having a surface temperature of 135° C. to obtain a sheet. The obtained sheet was thermally calendered with a hot calender having a steel roll plated with chromium and having a surface temperature of 195° C. as one of the rolls and a resin roll having a hardness of Shore D92 as the other roll and a linear pressure of 100 kN/m to produce a separator having a basis weight of 10 g/m² and a thickness of 15 μm.

Example 3-2

A separator having a basis weight of 10 g/m² and a thickness of 15 μm was manufactured in the same manner as in Example 3-1 except that 55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.0 parts by mass of the fibrid used in Example 3-1 and 2.5 parts by mass of the fibrillated heat-resistant fibers used in Example 3-1 were used.

Example 3-3

A separator having a basis weight of 10 g/m² and a thickness of 15 μm was manufactured in the same manner as in Example 3-1 except that 55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.5 parts by mass of the fibrid used in Example 3-1 and 2.0 parts by mass of the fibrillated heat-resistant fibers used in Example 3-1 were used.

Example 3-4

A separator having a basis weight of 10 g/m² and a thickness of 15 μm was manufactured in the same manner as in Example 3-1 except that 55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 3.5 parts by mass of the fibrid used in Example 3-1 and 1.0 part by mass of the fibrillated heat-resistant fibers used in Example 3-1 were used.

Example 3-5

A separator having a basis weight of 10 g/m² and a thickness of 15 μm was manufactured in the same manner as in Example 3-1 except that 59.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 0.4 part by mass of the fibrid used in Example 3-1 and 0.6 part by mass of the fibrillated heat-resistant fibers used in Example 3-1 were used.

Example 3-6

A separator having a basis weight of 8 g/m² and a thickness of 12 μm was manufactured in the same manner as in Example 3-1 except that 56.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 1.0 part by mass of the fibrid used in Example 3-1 and 2.5 parts by mass of the fibrillated heat-resistant fibers used in Example 3-1 were used.

Example 3-7

A separator having a basis weight of 7 g/m² and a thickness of 10 μm was manufactured in the same manner as in Example 3-1 except that 53.1 parts by mass of oriented crystallized PET-based synthetic resin short fibers having a fineness of 0.06 dtex and a fiber length of 3 mm, 42.0 parts by mass of undrawn PET-based synthetic resin short fibers for single-component binders having a fineness of 0.2 dtex and a fiber length of 3 mm, 1.0 part by mass of the fibrid used in Example 3-1 and 3.9 parts by mass of the fibrillated heat-resistant fibers used in Example 3-1 were used.

Example 3-8

A separator having a basis weight of 8 g/m² and a thickness of 12 μm was manufactured in the same manner as in Example 3-1 except that 48.0 parts by mass of oriented crystallized PET-based synthetic resin short fibers having a fineness of 0.06 dtex and a fiber length of 3 mm, 42.0 parts by mass of undrawn PET-based synthetic resin short fibers for single-component binders having a fineness of 0.2 dtex and a fiber length of 3 mm, 2.0 parts by mass of the fibrid used in Example 3-1, 2.5 parts by mass of the fibrillated heat-resistant fibers used in Example 3-1 and 5.5 parts by mass of beaten solvent spun cellulose fibers having a modified freeness of 90 ml obtained by refining solvent spun cellulose fibers having an average fiber diameter of 10 μm and a fiber length of 4 mm with a refiner were used.

Example 3-9

A separator having a basis weight of 8 g/m² and a thickness of 12 μm was manufactured in the same manner as in Example 3-1 except that 47.0 parts by mass of oriented crystallized PET-based synthetic resin short fibers having a fineness of 0.06 dtex and a fiber length of 3 mm, 42.0 parts by mass of undrawn PET-based synthetic resin short fibers for single-component binders having a fineness of 0.2 dtex and a fiber length of 3 mm, 2.0 parts by mass of the fibrid used in Example 3-1, 2.5 parts by mass of the fibrillated heat-resistant fibers used in Example 3-1 and 6.5 parts by mass of the beaten solvent spun cellulose fibers used in Example 3-8 were used.

Comparative Example 3-1

A separator having a basis weight of 10 g/m² and a thickness of 15 μm was manufactured in the same manner as in Example 3-1 except that 60.0 parts by mass of oriented crystallized PET-based synthetic resin short fibers having a fineness of 0.06 dtex and a fiber length of 3 mm and 40.0 parts by mass of undrawn PET-based synthetic resin short fibers for single-component binders having a fineness of 0.2 dtex and a fiber length of 3 mm (softening point of 120° C., melting point of 230° C.) were used.

Comparative Example 3-2

A separator having a basis weight of 8 g/m² and a thickness of 12 μm was manufactured in the same manner as in Example 3-1 except that 60.0 parts by mass of oriented crystallized PET-based synthetic resin short fibers having a fineness of 0.06 dtex and a fiber length of 3 mm and 40.0 parts by mass of undrawn PET-based synthetic resin short fibers for single-component binders having a fineness of 0.2 dtex and a fiber length of 3 mm (softening point of 120° C., melting point of 230° C.) were used and hot calendering was carried out at a steel roll surface temperature of 195° C. and a linear pressure of 90 kN/m to make the separator uniform in thickness.

Comparative Example 3-3

A separator having a basis weight of 7 g/m² and a thickness of 10 μm was manufactured in the same manner as in Example 3-1 except that 53.0 parts by mass of oriented crystallized PET-based synthetic resin short fibers having a fineness of 0.06 dtex and a fiber length of 3 mm, 42.0 parts by mass of undrawn PET-based synthetic resin short fibers for single-component binders having a fineness of 0.2 dtex and a fiber length of 3 mm, 2.5 parts by mass of the fibrid used in Example 3-1 and 2.5 parts by mass of the fibrillated heat-resistant fibers used in Example 3-1 were used.

Comparative Example 3-4

A separator having a basis weight of 8 g/m² and a thickness of 12 μm was manufactured in the same manner as in Example 3-1 except that 55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.), 2.0 parts by mass of a fibrid made of para-aromatic polyamide having a modified freeness of 310 ml and 2.5 parts by mass of fibrillated heat-resistant fibers having a modified freeness of 320 ml were used and hot calendering was carried out at a steel roll surface temperature of 195° C. and a linear pressure of 120 kN/m to make the separator uniform in thickness.

TABLE 5

| | | | Ex. 3-1 | Ex. 3-2 | Ex. 3-3 | Ex. 3-4 | Ex. 3-5 |
|---|---|---|---|---|---|---|---|
| Fiber blending | Oriented crystallized PET-based synthetic resin short fibers 0.06 dtex 3 mm | pbm | 55.5 | 55.5 | 55.5 | 55.5 | 59.0 |
| | Undrawn PET-based synthetic resin short fibers 0.2 dtex 3 mm | pbm | 40.0 | 40.0 | 40.0 | 40.0 | 40.0 |
| | fibrid made of para-aromatic polyamide | pbm | 1.0 | 2.0 | 2.5 | 3.5 | 0.4 |
| | Fibrillated heat-resistant fibers made of para-aromatic polyamide | pbm | 3.5 | 2.5 | 2.0 | 1.0 | 0.6 |
| | beaten solvent spun cellulose fibers | pbm | 0.0 | 0.0 | 0.0 | 0.0 | 0.0 |
| | Content of heat-resistant fibers having a modified freeness of not more than 300 ml | mass % | 4.5 | 4.5 | 4.5 | 4.5 | 1.0 |
| Fibrid | Modified freeness | ml | 88 | 88 | 88 | 88 | 88 |
| | Mass-weighted average fiber length | mm | 0.52 | 0.52 | 0.52 | 0.52 | 0.52 |
| | Length-weighted average fiber length | mm | 0.32 | 0.32 | 0.32 | 0.32 | 0.32 |
| | Fiber width | μm | 24.1 | 24.1 | 24.1 | 24.1 | 24.1 |
| Fibrillated heat-resistant fibers | Modified freeness | ml | 50 | 50 | 50 | 50 | 50 |
| | Mass-weighted average fiber length | mm | 0.58 | 0.58 | 0.58 | 0.58 | 0.58 |
| | Length-weighted average fiber length | mm | 0.33 | 0.33 | 0.33 | 0.33 | 0.33 |
| | Fiber width | μm | 15.5 | 15.5 | 15.5 | 15.5 | 15.5 |
| | Linear pressure of hot calender | kN/m | 100 | 100 | 100 | 100 | 100 |
| Evaluation | Weight of separator | g/m² | 10 | 10 | 10 | 10 | 10 |
| | Thickness of separator | μm | 15 | 15 | 15 | 15 | 15 |
| | Tensile strength of separator | — | ◎ | ◎ | ◎ | ◎ | ◎ |
| | Cuttability of separator | — | ○ | ○ | ○ | ○ | ○ |
| | Resistance component (impedance) | Ω | 0.55 | 0.57 | 0.59 | 0.60 | 0.55 |
| | Incidence of internal short circuit failure | % | 0.0 | 0.0 | 0.0 | 0.0 | 0.0 |
| | Cycle characteristics | % | 90 | 88 | 83 | 80 | 88 |

Ex.: Example
pbm: part by mass

TABLE 6

|  |  |  | Ex. 3-6 | Ex. 3-7 | Ex. 3-8 | Ex. 3-9 |
|---|---|---|---|---|---|---|
| Fiber blending | Oriented crystallized PET-based synthetic resin short fibers 0.06 dtex 3 mm | pbm | 56.5 | 53.1 | 48.0 | 47.0 |
|  | Undrawn PET-based synthetic resin short fibers 0.2 dtex 3 mm | pbm | 40.0 | 42.0 | 42.0 | 42.0 |
|  | fibrid made of para-aromatic polyamide | pbm | 1.0 | 1.0 | 2.0 | 2.0 |
|  | Fibrillated heat-resistant fibers made of para-aromatic polyamide | pbm | 2.5 | 3.9 | 2.5 | 2.5 |
|  | beaten solvent spun cellulose fibers | pbm | 0.0 | 0.0 | 5.5 | 6.5 |
|  | Content of heat-resistant fibers having a modified freeness of not more than 300 ml | mass % | 3.5 | 4.9 | 4.5 | 4.5 |
| Fibrid | Modified freeness | ml | 88 | 88 | 88 | 88 |
|  | Mass-weighted average fiber length | mm | 0.52 | 0.52 | 0.52 | 0.52 |
|  | Length-weighted average fiber length | mm | 0.32 | 0.32 | 0.32 | 0.32 |
|  | Fiber width | μm | 24.1 | 24.1 | 24.1 | 24.1 |
| Fibrillated heat-resistant fibers | Modified freeness | ml | 50 | 50 | 50 | 50 |
|  | Mass-weighted average fiber length | mm | 0.58 | 0.58 | 0.58 | 0.58 |
|  | Length-weighted average fiber length | mm | 0.33 | 0.33 | 0.33 | 0.33 |
|  | Fiber width | μm | 15.5 | 15.5 | 15.5 | 15.5 |
|  | Linear pressure of hot calender | kN/m | 100 | 100 | 100 | 100 |
| Evaluation | Weight of separator | g/m$^2$ | 8 | 7 | 8 | 8 |
|  | Thickness of separator | μm | 12 | 10 | 12 | 12 |
|  | Tensile strength of separator | — | ○ | ○ | ○ | Δ |
|  | Cuttability of separator | — | ○ | ○ | ○ | ○ |
|  | Resistance component (impedance) | Ω | 0.48 | 0.43 | 0.48 | 0.47 |
|  | Incidence of internal short circuit failure | % | 0.0 | 0.0 | 0.0 | 0.0 |
|  | Cycle characteristics | % | 88 | 85 | 88 | 88 |

Ex.: Example
pbm: part by mass

TABLE 7

|  |  |  | C. Ex. 3-1 | C. Ex. 3-2 | C. Ex. 3-3 | C. Ex. 3-4 |
|---|---|---|---|---|---|---|
| Fiber blending | Oriented crystallized PET-based synthetic resin short fibers 0.06 dtex 3 mm | pbm | 60.0 | 60.0 | 53.0 | 55.5 |
|  | Undrawn PET-based synthetic resin short fibers 0.2 dtex 3 mm | pbm | 40.0 | 40.0 | 42.0 | 40.0 |
|  | fibrid made of para-aromatic polyamide | pbm | 0.0 | 0.0 | 2.5 | 2.0 |
|  | Fibrillated heat-resistant fibers made of para-aromatic polyamide | pbm | 0.0 | 0.0 | 2.5 | 2.5 |
|  | beaten solvent spun cellulose fibers | pbm | 0 | 0 | 0 | 0 |
|  | Content of heat-resistant fibers having a modified freeness of not more than 300 ml | mass % | 0.0 | 0.0 | 5.0 | 0.0 |
| Fibrid | Modified freeness | ml | — | — | 88 | 310 |
|  | Mass-weighted average fiber length | mm | — | — | 0.52 | 0.78 |
|  | Length-weighted average fiber length | mm | — | — | 0.32 | 0.56 |
|  | Fiber width | μm | — | — | 24.1 | 31.2 |
| Fibrillated heat-resistant fibers | Modified freeness | ml | — | — | 50 | 320 |
|  | Mass-weighted average fiber length | mm | — | — | 0.58 | 1.30 |
|  | Length-weighted average fiber length | mm | — | — | 0.33 | 0.59 |
|  | Fiber width | μm | — | — | 15.5 | 25.2 |
|  | Linear pressure of hot calender | kN/m | 100 | 90 | 100 | 120 |
| Evaluation | Weight of separator | g/m$^2$ | 10 | 8 | 7 | 8 |
|  | Thickness of separator | μm | 15 | 12 | 10 | 12 |
|  | Tensile strength of separator | — | ◎ | ◎ | Δ | Δ |
|  | Cuttability of separator | — | ○ | ○ | ○ | Δ |
|  | Resistance component (impedance) | Ω | 0.54 | 0.43 | 0.50 | 0.60 |
|  | Incidence of internal short circuit failure | % | 0.5 | 1.0 | 0.0 | 0.5 |
|  | Cycle characteristics | % | 85 | 70 | 75 | 70 | pbm: part by mass
C. Ex.: Comparative Example

The separators manufactured in Examples 3-1 to 3-9 were lithium ion battery separators containing heat-resistant fibers and synthetic resin short fibers, which contained a fibrid made of para-aromatic polyamide and fibrillated heat-resistant fibers (fibrillated heat-resistant fibers (I)) having a modified freeness of not more than 300 ml as the heat-resistant fibers and had a total content of the heat-resistant fibers of not less than 1.0 mass % to less than 5.0 mass based on the total of all the fiber components contained in the separator. The separators of Examples 3-1 to 3-9 had high tensile strength and excellent cuttability. They had a low impedance as the resistance component and a low incidence of internal short circuit failure. They were excellent in cycle characteristics though they had a small thickness of not more than 15 μm.

The separators of Examples 3-6 and 3-7 had content ratios of the fibrillated heat-resistant fibers (I) of 71 mass % and 80 mass % based on the total of all the heat-resistant fibers having a modified freeness of not more than 300 ml, respectively. The number of fiber networks increased, the fibrid firmly bonded these fiber networks, the impedance as the resistance component was low though the basis weights of the separators were 8 g/m$^2$ and 7 g/m$^2$, respectively, the incidence of internal short circuit failure was satisfactory, and strength characteristics could be retained.

It was found from comparison between Examples 3-1 to 3-2 and Examples 3-3 to 3-4 that, when the basis weight of the separator was 10 g/m$^2$, Examples 3-1 and 3-2 having higher content ratios of the fibrillated heat-resistant fibers (I) based on the total of all the heat-resistant fibers having a modified freeness of not more than 300 ml had a lower impedance as the resistance component and more excellent cycle characteristics.

The separators of Examples 3-8 and 3-9 contained fibers other than the fibrillated heat-resistant fibers having a modified freeness of not more than 300 ml and the synthetic resin short fibers. From comparison between Example 3-8 and Example 3-9, the separator of Example 3-8 having a content of the synthetic resin short fibers of not less than 90.0 mass % was superior in strength characteristics.

Since the separators of Comparative Examples 3-1 and 3-2 did not contain heat-resistant fibers having a modified freeness of not more than 300 ml, when the basis weight of the separator was reduced, internal short circuit failure was apt to occur.

The separator of Comparative Example 3-3 which had a basis weight of 7 g/m$^2$ and contained not less than 5 mass % of heat-resistant fibers having a modified freeness of not more than 300 ml had a higher impedance as the resistance component and lower strength and cycle characteristics than those of Example 3-7.

Since the modified freeness's of the fibrid and the fibrillated heat-resistant fibers of the separator of Comparative Example 3-4 exceeded 300 ml, the fiber width of the fibrid and the fiber diameter of the stem part of each of the fibrillated heat-resistant fibers were large, whereby the dispersibility of the fibers and entanglement between the fibers became worse, thereby deteriorating the texture of the separator. As a result, the strength characteristics, cuttability, impedance as the resistance component and incidence of internal short circuit failure of the separator became worse. The cycle characteristics of the separator also became worse.

Examples 4

Example 4-1

55.5 parts by mass of oriented crystallized polyethylene terephthalate (PET)-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.), 1.0 part by mass of a fibrid made of para-aromatic polyamide having a modified freeness of 88 ml obtained by defibrating and beating with a high-speed homogenizer, 1.0 part by mass of fibrillated heat-resistant fibers (fibrillated heat-resistant fibers (II)) obtained by fibrillating a pulp-like product (average fiber length of 1.7 mm, average fiber diameter of 10 μm) of para-aromatic polyamide fibers to a modified freeness of up to 350 ml with a high-pressure homogenizer and 2.5 parts by mass of fibrillated heat-resistant fibers (fibrillated heat-resistant fibers (I)) obtained by fibrillating a pulp-like product (average fiber length of 1.7 mm, average fiber diameter of 10 μm) of para-aromatic polyamide fibers to a modified freeness of up to 50 ml with a high-pressure homogenizer as heat-resistant fibers were dispersed in water with a pulper to prepare a homogeneous papermaking slurry having a concentration of 0.1 mass %, and a wet paper web was obtained by using an inclination type paper machine and dried with a cylinder drier having a surface temperature of 135° C. to obtain a sheet. The obtained sheet was calendered with a hot calender having a steel roll plated with chromium and having a surface temperature of 195° C. as one of the rolls and a resin roll having a hardness of Shore D92 as the other roll and a linear pressure of 100 kN/m to produce a separator having a basis weight of 10 g/m$^2$ and a thickness of 15 μm.

Example 4-2

A separator having a basis weight of 10 g/m$^2$ and a thickness of 15 μm was manufactured in the same manner as in Example 4-1 except that 55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 0.4 part by mass of the fibrid used in Example 4-1, 3.5 parts by mass of the fibrillated heat-resistant fibers (II) used in Example 4-1 and 0.6 part by mass of the fibrillated heat-resistant fibers (I) used in Example 4-1 were used.

Example 4-3

A separator having a basis weight of 10 g/m$^2$ and a thickness of 15 μm was manufactured in the same manner as in Example 4-1 except that 58.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 0.4 part by mass of the fibrid used in Example 4-1, 1.0 part by mass of the fibrillated heat-resistant fibers (II) used in Example 4-1 and 0.6 part by mass of the fibrillated heat-resistant fibers (I) used in Example 4-1 were used.

Example 4-4

A separator having a basis weight of 9 g/m$^2$ and a thickness of 13 μm was manufactured in the same manner as in Example 4-1 except that 55.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 1.0 part by mass of the fibrid used in Example 4-1, 1.5 parts by mass of the fibrillated heat-resistant fibers (II) used in Example 4-1 and 2.5 parts by mass of the fibrillated heat-resistant fibers (I) used in Example 4-1 were used.

Example 4-5

A separator having a basis weight of 8 g/m$^2$ and a thickness of 12 μm was manufactured in the same manner as in Example 4-1 except that 50.6 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm, 2.0 parts by mass of the fibrid used in Example 4-1, 3.9 parts by mass of the fibrillated heat-resistant fibers (II) used in Example 4-1 and 2.5 parts by mass of the fibrillated heat-resistant fibers (I) used in Example 4-1 were used.

Example 4-6

A separator having a basis weight of 8 g/m$^2$ and a thickness of 12 μm was manufactured in the same manner as in Example 4-1 except that 51.6 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm, 0.4 part by mass of the fibrid used in Example 4-1, 2.5 parts by mass of the fibrillated heat-resistant fibers (II) used in Example 4-1 and 4.5 parts by mass of the fibrillated heat-resistant fibers (I) used in Example 4-1 were used.

Example 4-7

A separator having a basis weight of 7 g/m$^2$ and a thickness of 10 μm was manufactured in the same manner as in Example 4-1 except that 54.5 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm, 0.8 part by mass of the fibrid used in Example 4-1, 1.2 parts by mass of the fibrillated heat-resistant fibers (II) used in Example 4-1 and 2.5 parts by mass of the fibrillated heat-resistant fibers (I) used in Example 4-1 were used.

Example 4-8

A separator having a basis weight of 7 g/m$^2$ and a thickness of 10 μm was manufactured in the same manner as in Example 4-1 except that 51.5 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm, 2.5 parts by mass of the fibrid used in Example 4-1, 2.5 parts by mass of the fibrillated heat-resistant fibers (II) used in Example 4-1 and 2.5 parts by mass of the fibrillated heat-resistant fibers (I) used in Example 4-1 were used.

Example 4-9

A separator having a basis weight of 7 g/m$^2$ and a thickness of 10 μm was manufactured in the same manner as in Example 4-1 except that 50.5 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm, 2.0 parts by mass of the fibrid used in Example 4-1, 4.0 parts by mass of the fibrillated heat-resistant fibers (II) used in Example 4-1 and 2.5 parts by mass of the fibrillated heat-resistant fibers (I) used in Example 4-1 were used and hot calendering was carried out at a steel roll surface temperature of 195° C. and a linear pressure of 110 kN/m to make the separator uniform in thickness.

Example 4-10

A separator having a basis weight of 7 g/m$^2$ and a thickness of 10 μm was manufactured in the same manner as in Example 4-1 except that 51.5 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm, 0.4 part by mass of the fibrid used in Example 4-1, 2.5 parts by mass of the fibrillated heat-resistant fibers (II) used in Example 4-1 and 4.6 parts by mass of the fibrillated heat-resistant fibers (I) used in Example 4-1 were used.

Example 4-11

A separator having a basis weight of 7 g/m$^2$ and a thickness of 10 μm was manufactured in the same manner as in Example 4-1 except that 50.4 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm, 2.5 parts by mass of the fibrid used in Example 4-1, 1.5 parts by mass of the fibrillated heat-resistant fibers (II) used in Example 4-1 and 4.6 parts by mass of the fibrillated heat-resistant fibers (I) used in Example 4-1 were used and hot calendering was carried out at a steel roll surface temperature of 195° C. and a linear pressure of 110 kN/m to make the separator uniform in thickness.

Example 4-12

A separator having a basis weight of 9 g/m$^2$ and a thickness of 13 μm was manufactured in the same manner as in Example 4-1 except that 50.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.0 parts by mass of the fibrid used in Example 4-1, 2.0 parts by mass of the fibrillated heat-resistant fibers (II) used in Example 4-1, 3.0 parts by mass of the fibrillated heat-resistant fibers (I) used in Example 4-1 and 3.0 parts by mass of beaten solvent spun cellulose fibers having a modified freeness of 90 ml obtained by refining solvent spun cellulose fibers having an average fiber diameter of 10 μm and a fiber length of 4 mm with a refiner were used.

Example 4-13

A separator having a basis weight of 9 g/m$^2$ and a thickness of 13 μm was manufactured in the same manner as in Example 4-1 except that 49.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.0 parts by mass of the fibrid used in Example 4-1, 2.0 parts by mass of the fibrillated heat-resistant fibers (II) used in Example 4-1, 3.0 parts by mass of the fibrillated heat-resistant fibers (I) used in Example 4-1 and 4.0 parts by mass of the beaten solvent spun cellulose fibers used in Example 4-12 were used.

Comparative Example 4-1

A separator having a basis weight of 8 g/m$^2$ and a thickness of 12 µm was manufactured in the same manner as in Example 4-1 except that 60.0 parts by mass of oriented crystallized PET-based synthetic resin short fibers having a fineness of 0.06 dtex and a fiber length of 3 mm and 40.0 parts by mass of undrawn PET-based synthetic resin short fibers for single-component binders having a fineness of 0.2 dtex and a fiber length of 3 mm (softening point of 120° C., melting point of 230° C.) were used.

Comparative Example 4-2

A separator having a basis weight of 7 g/m$^2$ and a thickness of 10 µm was manufactured in the same manner as in Example 4-1 except that 60.0 parts by mass of oriented crystallized PET-based synthetic resin short fibers having a fineness of 0.06 dtex and a fiber length of 3 mm and 40.0 parts by mass of undrawn PET-based synthetic resin short fibers for single-component binders having a fineness of 0.2 dtex and a fiber length of 3 mm (softening point of 120° C., melting point of 230° C.) were used.

Comparative Example 4-3

A separator having a basis weight of 7 g/m$^2$ and a thickness of 10 µm was manufactured in the same manner as in Example 4-1 except that 50.9 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.4 parts by mass of the fibrid used in Example 4-1, 3.9 parts by mass of the fibrillated heat-resistant fibers (II) used in Example 4-1 and 2.8 parts by mass of the fibrillated heat-resistant fibers (I) used in Example 4-1 were used and hot calendering was carried out at a steel roll surface temperature of 195° C. and a linear pressure of 120 kN/m to make the separator uniform in thickness.

Comparative Example 4-4

A separator having a basis weight of 7 g/m$^2$ and a thickness of 10 µm was manufactured in the same manner as in Example 4-1 except that 50.1 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm (softening point of 120° C., melting point of 230° C.) and 8.9 parts by mass of the fibrid used in Example 4-1 were used and hot calendering was carried out at a steel roll surface temperature of 195° C. and a linear pressure of 110 kN/m to make the separator uniform in thickness.

Comparative Example 4-5

A separator having a basis weight of 7 g/m$^2$ and a thickness of 10 µm was manufactured in the same manner as in Example 4-1 except that 50.1 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm (softening point of 120° C., melting point of 230° C.) and 8.9 parts by mass of the fibrillated heat-resistant fibers (II) used in Example 4-1 were used and hot calendering was carried out at a steel roll surface temperature of 195° C. and a linear pressure of 120 kN/m to make the separator uniform in thickness.

Comparative Example 4-6

A separator having a basis weight of 7 g/m$^2$ and a thickness of 10 µm was manufactured in the same manner as in Example 4-1 except that 50.1 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm (softening point of 120° C., melting point of 230° C.) and 8.9 parts by mass of the fibrillated heat-resistant fibers (I) used in Example 4-1 were used and hot calendering was carried out at a steel roll surface temperature of 195° C. and a linear pressure of 120 kN/m to make the separator uniform in thickness.

Comparative Example 4-7

A separator having a basis weight of 7 g/m$^2$ and a thickness of 10 µm was manufactured in the same manner as in Example 4-1 except that 50.1 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm (softening point of 120° C., melting point of 230° C.), 3.9 parts by mass of the fibrid used in Example 4-1 and 5.0 parts by mass of the fibrillated heat-resistant fibers (I) used in Example 4-1 were used and hot calendering was carried out at a steel roll surface temperature of 195° C. and a linear pressure of 120 kN/m to make the separator uniform in thickness.

Comparative Example 4-8

A separator having a basis weight of 7 g/m$^2$ and a thickness of 10 µm was manufactured in the same manner as in Example 4-1 except that 50.1 parts by mass of oriented crystallized PET-based synthetic resin short fibers having a fineness of 0.06 dtex and a fiber length of 3 mm, 41.0 parts by mass of undrawn PET-based synthetic resin short fibers for single-component binders having a fineness of 0.2 dtex and a fiber length of 3 mm (softening point of 120° C., melting point of 230° C.), 3.9 parts by mass of the fibrillated heat-resistant fibers (II) used in Example 4-1 and 5.0 parts by mass of the fibrillated heat-resistant fibers (I) used in Example 4-1 were used and hot calendering was carried out at a steel roll surface temperature of 195° C. and a linear pressure of 120 kN/m to make the separator uniform in thickness.

TABLE 8

|  |  |  | Ex. 4-1 | Ex. 4-2 | Ex. 4-3 | Ex. 4-4 | Ex. 4-5 | Ex. 4-6 |
|---|---|---|---|---|---|---|---|---|
| Fiber blending | Oriented crystallized PET-based synthetic resin short fibers 0.06 dtex 3 mm | pbm | 55.5 | 55.5 | 58.0 | 55.0 | 50.6 | 51.6 |
|  | Undrawn PET-based synthetic resin short fibers 0.2 dtex 3 mm | pbm | 40.0 | 40.0 | 40.0 | 40.0 | 41.0 | 41.0 |
|  | Fibrid made of para-aromatic polyamide | pbm | 1.0 | 0.4 | 0.4 | 1.0 | 2.0 | 0.4 |
|  | Fibrillated heat-resistant fibers (II) having a modified freeness of more than 300 ml | pbm | 1.0 | 3.5 | 1.0 | 1.5 | 3.9 | 2.5 |
|  | Fibrillated heat-resistant fibers (I) having a modified freeness of not more than 300 ml | pbm | 2.5 | 0.6 | 0.6 | 2.5 | 2.5 | 4.5 |
|  | Heat resistant fibers | pbm | 4.5 | 4.5 | 2.0 | 5.0 | 8.4 | 7.4 |
|  | Beaten solvent spun cellulose fibers | pbm | 0.0 | 0.0 | 0.0 | 0.0 | 0.0 | 0.0 |
| Fibrid | Modified freeness | ml | 88 | 88 | 88 | 88 | 88 | 88 |
|  | Mass-weighted average fiber length | mm | 0.52 | 0.52 | 0.52 | 0.52 | 0.52 | 0.52 |
|  | Length-weighted average fiber length | mm | 0.32 | 0.32 | 0.32 | 0.32 | 0.32 | 0.32 |
|  | Fiber width | μm | 24.1 | 24.1 | 24.1 | 24.1 | 24.1 | 24.1 |
| Fibrillated heat-resistant fibers (II) having a modified freeness of more than 300 ml | Modified freeness | ml | 350 | 350 | 350 | 350 | 350 | 350 |
|  | Mass-weighted average fiber length | mm | 1.30 | 1.30 | 1.30 | 1.30 | 1.30 | 1.30 |
|  | Length-weighted average fiber length | mm | 0.59 | 0.59 | 0.59 | 0.59 | 0.59 | 0.59 |
|  | Fiber width | μm | 25.2 | 25.2 | 25.2 | 25.2 | 25.2 | 25.2 |
| Fibrillated heat-resistant fibers (I) having a modified freeness of not more than 300 ml | Modified freeness | ml | 50 | 50 | 50 | 50 | 50 | 50 |
|  | Mass-weighted average fiber length | mm | 0.58 | 0.58 | 0.58 | 0.58 | 0.58 | 0.58 |
|  | Length-weighted average fiber length | mm | 0.33 | 0.33 | 0.33 | 0.33 | 0.33 | 0.33 |
|  | Fiber width | μm | 15.5 | 15.5 | 15.5 | 15.5 | 15.5 | 15.5 |
|  | Linear pressure of hot calender | kN/m | 100 | 100 | 100 | 100 | 100 | 100 |
| Evaluation | Weight of separator | g/m$^2$ | 10 | 10 | 10 | 9 | 8 | 8 |
|  | Thickness of separator | μm | 15 | 15 | 15 | 13 | 12 | 12 |
|  | Tensile strength of separator | — | ⊚ | ⊚ | ⊚ | ⊚ | ○ | ○ |
|  | Cuttability of separator | — | ○ | ○ | ○ | ○ | ○ | ○ |
|  | Resistance component (impedance) | Ω | 0.55 | 0.57 | 0.54 | 0.53 | 0.52 | 0.50 |
|  | Incidence of internal short circuit failure | % | 0.0 | 0.0 | 0.0 | 0.0 | 0.0 | 0.0 |
|  | Cycle characteristics | % | 90 | 88 | 90 | 90 | 83 | 85 |

Ex.: Example
pbm: part by mass

TABLE 9

|  |  |  | Ex. 4-7 | Ex. 4-8 | Ex. 4-9 | Ex. 4-10 | Ex. 4-11 | Ex. 4-12 | Ex. 4-13 |
|---|---|---|---|---|---|---|---|---|---|
| Fiber blending | Oriented crystallized PET-based synthetic resin short fibers 0.06 dtex 3 mm | pbm | 54.5 | 51.5 | 50.5 | 51.5 | 50.4 | 50.0 | 49.0 |
|  | Undrawn PET-based synthetic resin short fibers 0.2 dtex 3 mm | pbm | 41.0 | 41.0 | 41.0 | 41.0 | 41.0 | 40.0 | 40.0 |
|  | Fibrid made of para-aromatic polyamide | pbm | 0.8 | 2.5 | 2.0 | 0.4 | 2.5 | 2.0 | 2.0 |
|  | Fibrillated heat-resistant fibers (II) having a modified freeness of more than 300 ml | pbm | 1.2 | 2.5 | 4.0 | 2.5 | 1.5 | 2.0 | 2.0 |
|  | Fibrillated heat-resistant fibers (I) having a modified freeness of not more than 300 ml | pbm | 2.5 | 2.5 | 2.5 | 4.6 | 4.6 | 3.0 | 3.0 |
|  | Heat resistant fibers | pbm | 4.5 | 7.5 | 8.5 | 7.5 | 8.6 | 7.0 | 7.0 |
|  | Beaten solvent spun cellulose fibers | pbm | 0.0 | 0.0 | 0.0 | 0.0 | 0.0 | 3.0 | 4.0 |
| Fibrid | Modified freeness | ml | 88 | 88 | 88 | 88 | 88 | 88 | 88 |
|  | Mass-weighted average fiber length | mm | 0.52 | 0.52 | 0.52 | 0.52 | 0.52 | 0.52 | 0.52 |
|  | Length-weighted average fiber length | mm | 0.32 | 0.32 | 0.32 | 0.32 | 0.32 | 0.32 | 0.32 |
|  | Fiber width | μm | 24.1 | 24.1 | 24.1 | 24.1 | 24.1 | 24.1 | 24.1 |

TABLE 9-continued

|  |  |  | Ex. 4-7 | Ex. 4-8 | Ex. 4-9 | Ex. 4-10 | Ex. 4-11 | Ex. 4-12 | Ex. 4-13 |
|---|---|---|---|---|---|---|---|---|---|
| Fibrillated heat-resistant fibers (II) having a modified freeness of more than 300 ml | Modified freeness | ml | 350 | 350 | 350 | 350 | 350 | 350 | 350 |
|  | Mass-weighted average fiber length | mm | 1.30 | 1.30 | 1.30 | 1.30 | 1.30 | 1.30 | 1.30 |
|  | Length-weighted average fiber length | mm | 0.59 | 0.59 | 0.59 | 0.59 | 0.59 | 0.59 | 0.59 |
|  | Fiber width | μm | 25.2 | 25.2 | 25.2 | 25.2 | 25.2 | 25.2 | 25.2 |
| Fibrillated heat-resistant fibers (I) having a modified freeness of not more than 300 ml | Modified freeness | ml | 50 | 50 | 50 | 50 | 50 | 50 | 50 |
|  | Mass-weighted average fiber length | mm | 0.58 | 0.58 | 0.58 | 0.58 | 0.58 | 0.58 | 0.58 |
|  | Length-weighted average fiber length | mm | 0.33 | 0.33 | 0.33 | 0.33 | 0.33 | 0.33 | 0.33 |
|  | Fiber width | μm | 15.5 | 15.5 | 15.5 | 15.5 | 15.5 | 15.5 | 15.5 |
|  | Linear pressure of hot calender | kN/m | 100 | 100 | 110 | 100 | 110 | 100 | 100 |
| Evaluation | Weight of separator | g/m² | 7 | 7 | 7 | 7 | 7 | 9 | 9 |
|  | Thickness of separator | μpm | 10 | 10 | 10 | 10 | 10 | 13 | 13 |
|  | Tensile strength of separator | — | — | ◯ | ◯ | ◯ | ◯ | ◯ | Δ |
|  | Cuttability of separator | — | — | ◯ | Δ | ◯ | ◯ | ◯ | ◯ |
|  | Resistance component (impedance) | Ω | 0.45 | 0.50 | 0.52 | 0.50 | 0.52 | 0.50 | 0.49 |
|  | Incidence of internal short circuit failure | % | 0.0 | 0.0 | 0.0 | 0.0 | 0.0 | 0.0 | 0.0 |
|  | Cycle characteristics | % | 87 | 82 | 82 | 82 | 80 | 88 | 88 |

Ex.: Example pbm: part by mass

TABLE 10

|  |  |  | C. EX. 4-1 | C. EX. 4-2 | C. EX. 4-3 | C. EX. 4-4 | C. EX. 4-5 | C. EX. 4-6 | C. EX. 4-7 | C. EX. 4-8 |
|---|---|---|---|---|---|---|---|---|---|---|
| Fiber blending | Oriented crystallized PET-based synthetic resin short fibers 0.06 dtex 3 mm | pbm | 60.0 | 60.0 | 50.9 | 50.1 | 50.1 | 50.1 | 50.1 | 50.1 |
|  | Undrawn PET-based synthetic resin short fibers 0.2 dtex 3 mm | pbm | 40.0 | 40.0 | 40.0 | 41.0 | 41.0 | 41.0 | 41.0 | 41.0 |
|  | Fibrid made of para-aromatic polyamide | pbm | 0.0 | 0.0 | 2.4 | 8.9 | 0.0 | 0.0 | 3.9 | 0.0 |
|  | Fibrillated heat-resistant fibers (II) having a modified freeness of more than 300 ml | pbm | 0.0 | 0.0 | 3.9 | 0.0 | 8.9 | 0.0 | 0.0 | 3.9 |
|  | Fibrillated heat-resistant fibers (I) having a modified freeness of not more than 300 ml | pbm | 0.0 | 0.0 | 2.8 | 0.0 | 0.0 | 8.9 | 5.0 | 5.0 |
|  | Heat resistant fibers | pbm | 0.0 | 0.0 | 9.1 | 8.9 | 8.9 | 8.9 | 8.9 | 8.9 |
|  | Beaten solvent spun cellulose fibers | pbm | 0.0 | 0.0 | 0.0 | 0.0 | 0.0 | 0.0 | 0.0 | 0.0 |
| Fibrid | Modified freeness | ml | — | — | 88 | 88 | — | — | 88 | — |
|  | Mass-weighted average fiber length | mm | — | — | 0.52 | 0.52 | — | — | 0.52 | — |
|  | Length-weighted average fiber length | mm | — | — | 0.32 | 0.32 | — | — | 0.32 | — |
|  | Fiber width | μm | — | — | 24.1 | 24.1 | — | — | 24.1 | — |
| Fibrillated heat-resistant fibers (II) having a modified freeness of more than 300 ml | Modified freeness | ml | — | — | 350 | — | 350 | — | — | 350 |
|  | Mass-weighted average fiber length | mm | — | — | 1.30 | — | 1.30 | — | — | 1.30 |
|  | Length-weighted average fiber length | mm | — | — | 0.59 | — | 0.59 | — | — | 0.59 |
|  | Fiber width | μm | — | — | 25.2 | — | 25.2 | — | — | 25.2 |
| Fibrillated heat-resistant fibers (I) | Modified freeness | ml | — | — | 50 | — | — | 50 | 50 | 50 |
|  | Mass-weighted average fiber length | mm | — | — | 0.58 | — | — | 0.58 | 0.58 | 0.58 |

TABLE 10-continued

|  |  |  | C. EX. 4-1 | C. EX. 4-2 | C. EX. 4-3 | C. EX. 4-4 | C. EX. 4-5 | C. EX. 4-6 | C. EX. 4-7 | C. EX. 4-8 |
|---|---|---|---|---|---|---|---|---|---|---|
| having a modified freeness of not more than 300 ml | Length-weighted average fiber length | mm | — | — | 0.33 | — | — | 0.33 | 0.33 | 0.33 |
|  | Fiber width | μm | — | — | 15.5 | — | — | 15.5 | 15.5 | 15.5 |
| Linear pressure of hot calender |  | kN/m | 100 | 100 | 120 | 110 | 120 | 120 | 120 | 120 |
| Evaluation | Weight of separator | g/m² | 8 | 7 | 7 | 7 | 7 | 7 | 7 | 7 |
|  | Thickness of separator | μm | 12 | 10 | 10 | 10 | 10 | 10 | 10 | 10 |
|  | Tensile strength of separator | — | ◎ | ○ | Δ | ○ | Δ | Δ | Δ | Δ |
|  | Cuttability of separator | — | — | ○ | ○ | Δ | Δ | X | X | X | Δ |
|  | Resistance component (impedance) | Ω | 0.43 | 0.39 | 0.65 | 0.75 | 0.73 | 0.60 | 0.70 | 0.55 |
|  | Incidence of internal short circuit failure | % | 1.0 | 1.5 | 0.0 | 0.0 | 0.0 | 0.0 | 0.0 | 0.0 |
|  | Cycle characteristics | % | 70 | 70 | 68 | 60 | 65 | 70 | 65 | 78 |

C. Ex.: Comparative Example
pbm: part by mass

The separators manufactured in Examples 4-1 to 4-13 contained a fibrid made of para-aromatic polyamide, fibrillated heat-resistant fibers having a modified freeness of more than 300 ml (fibrillated heat-resistant fibers (II)), fibrillated heat-resistant fibers having a modified freeness of not more than 300 ml (fibrillated heat-resistant fibers (I)) and synthetic resin short fibers and had a total content of the three different types of heat-resistant fibers of not less than 2.0 mass % to less than 9.0 mass % based on the total of all the fiber components contained in the separator. Although the separators of Examples 4-1 to 4-13 had a small thickness of not more than 15 μm, they were excellent in strength characteristics and cuttability. They had a low impedance as the resistance component, a low incidence of internal short circuit failure and excellent cycle characteristics. The separators of Examples 4-1 to 4-7 and the separators of Examples 4-12 to 4-13 in which the total content of the heat-resistant fibers was not less than 2.0 mass % to less than 9.0 mass %, the content of the fibrid made of para-aromatic polyamide was not less than 0.4 mass % to less than 2.5 mass %, the content of the fibrillated heat-resistant fibers (II) was not less than 1.0 mass % to less than 4.0 mass % and the content of the fibrillated heat-resistant fibers (I) was not less than 0.6 mass % to less than 4.6 mass % had excellent cuttability, a low impedance as the resistance component, a low incidence of internal short circuit failure and excellent cycle characteristics.

Out of the separators manufactured in Examples 4-1 to 4-13, the separator of Example 4-7 had a total content of the three different types of heat-resistant fibers of not less than 2.0 mass % to less than 9.0 mass %, a content of the fibrid of not less than 0.4 mass % to less than 2.5 mass %, a content of the fibrillated heat-resistant fibers (II) of not less than 1.0 mass % to less than 4.0 mass % and a content of the fibrillated heat-resistant fibers (I) of not less than 0.6 mass % to less than 4.6 mass %, all of which are preferred contents. Although the separator had a basis weight of 7 g/m² and a thickness of 10 μm, they had no internal short circuit failure, a low impedance as the resistance component and excellent cycle characteristics.

Out of the separators manufactured in Examples 4-1 to 4-13, the separator of Example 4-8 had a total content of the three different types of heat-resistant fibers of not less than 2.0 mass % to less than 9.0 mass %, a content of the fibrillated heat-resistant fibers (II) of not less than 1.0 mass % to less than 4.0 mass % and a content of the fibrillated heat-resistant fibers (I) of not less than 0.6 mass % to less than 4.6 mass % but a content of the fibrid of not less than 2.5 mass %. Although the separator had a basis weight of 7 g/m², the impedance as the resistance component of the separator was the same as that of a separator having a basis weight of 8 g/m² and the cycle characteristics were slightly lower than those of the separator of Example 4-7.

Out of the separators manufactured in Examples 4-1 to 4-13, the separator of Example 4-9 had a total content of the three different types of heat-resistant fibers of not less than 2.0 mass % to less than 9.0 mass, a content of the fibrid of not less than 0.4 mass % to less than 2.5 mass % and a content of the fibrillated heat-resistant fibers (I) of not less than 0.6 mass % to less than 4.6 mass % but a content of the fibrillated heat-resistant fibers (II) of not less than 4.0 mass %. Therefore, as a large number of thick para-aromatic polyamide stem fibers remained, fluff slightly remained on the edge surface. Further, it was found that a high linear pressure had to be applied at the time of controlling the thickness of the separator to a predetermined value by hot calendering, thereby making it difficult to reduce the thickness of the separator. The impedance as the resistance component of the separator was the same as that of a separator having a basis weight of 8 g/m² and the cycle characteristics were slightly lower than those of the separator of Example 4-7.

Out of the separators manufactured in Examples 4-1 to 4-13, the separator of Example 4-10 had a total content of the three different types of heat-resistant fibers of not less than 2.0 mass % to less than 9.0 mass, a content of the fibrid of not less than 0.4 mass % to less than 2.5 mass % and a content of the fibrillated heat-resistant fibers (II) of not less than 1.0 mass % to less than 4.0 mass % but a content of the fibrillated heat-resistant fibers (I) of not less than 4.6 mass %. Therefore, the impedance as the resistance component of the separator was the same as that of a separator having a basis weight of 8 g/m² and the cycle characteristics were slightly lower than those of the separator of Example 4-7.

Out of the separators manufactured in Examples 4-1 to 4-13, the separator of Example 4-11 had a total content of the three different types of heat-resistant fibers of not less than 2.0 mass % to less than 9.0 mass % and a content of the fibrillated heat-resistant fibers (II) of not less than 1.0 mass % to less than 4.0 mass % but a content of the fibrid of not less than 2.5 mass % and a content of the fibrillated heat-resistant fibers (I) of not less than 4.6 mass %. Therefore, the impedance as the resistance component of the separator was the same as that of a separator having a basis weight of 8 g/m² and the cycle characteristics were slightly lower than those of the separator of Example 4-7.

The separators of Examples 4-12 and 4-13 contained fibers other than the fibrid, the fibrillated heat-resistant fibers (I), the fibrillated heat-resistant fibers (II) and the synthetic resin short fibers. From comparison between Example 4-12 and Example 4-13, the separator of Example 4-12 having a content of the synthetic resin short fibers of not less than 90.0 mass % was superior in strength characteristics.

Since the separators of Comparative Examples 4-1 and 4-2 did not contain the three different types of heat-resistant fibers, when the basis weight of the separator was reduced, the incidence of internal short circuit failure became worse.

In Comparative Example 4-3, the content of the fibrid was not less than 0.4 mass % to less than 2.5 mass %, the content of the fibrillated heat-resistant fibers (II) was not less than 1.0 mass % to less than 4.0 mass % and the content of the fibrillated heat-resistant fibers (I) was not less than 0.6 mass % to less than 4.6 mass % but the total content of the three different types of heat-resistant fibers was more than 9.0 mass %. Since the number of fine fibril fibers greatly increased, bonding between fibers became loose, thereby deteriorating strength characteristics. In the evaluation of cuttability, fluff slightly remained on the edge surface. Further, a high linear pressure had to be applied at the time of controlling the thickness of the separator to a predetermined value by hot calendering. As a result, the film formation of the PET fibers for binders proceeded, thereby raising the impedance as the resistance component and deteriorating the cycle characteristics.

In Comparative Example 4-4, only the fibrid was contained in an amount of 8.9 mass %. Although the content of the heat-resistant fibers was not less than 2.0 mass % to less than 9.0 mass, when only the fibrid was contained, fluff slightly remained on the edge surface in the evaluation of cuttability. Since the fibrous form of the fibrid was thin leaf-like, the impedance as the resistance component greatly rose and the cycle characteristics deteriorated.

In Comparative Example 4-5, only the fibrillated heat-resistant fibers (II) were contained in an amount of 8.9 mass %. Although the content of the heat-resistant fibers was not less than 2.0 mass % to less than 9.0 mass %, when only the fibrillated heat-resistant fibers (II) were contained, a large number of thick para-aromatic polyamide stem fibers remained, cutting was difficult and fluff remained on the edge surface. Further, a high linear pressure had to be applied at the time of controlling the thickness of the separator to a predetermined value by hot calendering. As a result, the film formation of the PET fibers for binders proceeded, thereby raising the impedance as the resistance component and deteriorating the cycle characteristics. Since there are a large number of thick aromatic polyamide stem fibers, a fiber network became weak, thereby deteriorating strength characteristics.

In Comparative Example 4-6, only the fibrillated heat-resistant fibers (I) were contained in an amount of 8.9 mass %. Although the content of the heat-resistant fibers was not less than 2.0 mass % to less than 9.0 mass %, when only the fibrillated heat-resistant fibers (I) were contained, the number of fine fibrillated fibers greatly increased, whereby cutting was difficult and fluff remained on the edge surface. Further, a high linear pressure had to be applied at the time of controlling the thickness of the separator to a predetermined value by hot calendering. As a result, the film formation of the PET fibers for binders proceeded, thereby raising the impedance as the resistance component and deteriorating the cycle characteristics. Since the number of fine fibril fibers increased too much, bonding between fibers became loose, thereby deteriorating strength characteristics.

In Comparative Example 4-7, 3.9 mass % of the fibrid and 5.0 mass % of the fibrillated heat-resistant fibers (I) were contained. Although the total content of the heat-resistant fibers was not less than 2.0 mass % to less than 9.0 mass %, as the number of fine fibrillated fibers greatly increased, cutting was difficult and fluff remained on the edge surface. Further, a high linear pressure had to be applied at the time of controlling the thickness of the separator to a predetermined value by hot calendering. As a result, the film formation of the PET fibers for binders proceeded and the fibrous form of the fibrid was thin leaf-like, thereby greatly raising the impedance as the resistance component and deteriorating the cycle characteristics. Further, since the number of fine fibril fibers increased too much, bonding between fibers became loose, thereby deteriorating strength characteristics.

In Comparative Example 4-8, 3.9 mass % of the fibrillated heat-resistant fibers (II) and 5.0 mass % of the fibrillated heat-resistant fibers (I) were contained. Although the total content of the heat-resistant fibers was not less than 2.0 mass % to less than 9.0 mass %, since a large number of thick para-aromatic polyamide stem fibers remained and the number of fine fibrillated fibers increased, cutting was difficult and fluff slightly remained on the edge surface. Further, a high linear pressure had to be applied at the time of controlling the thickness of the separator to a predetermined value by hot calendering. As a result, the film formation of the PET fibers for binders proceeded, thereby raising the impedance as the resistance component and deteriorating the cycle characteristics. Further, as the number of fine fibril fibers increased too much, bonding between fibers became loose, thereby deteriorating strength characteristics.

INDUSTRIAL FEASIBILITY

The lithium ion battery separator of the present invention can be advantageously used in lithium ion secondary batteries, lithium ion polymer secondary batteries and lithium ion batteries.

The invention claimed is:

1. A lithium ion battery separator comprising heat-resistant fibers and synthetic resin fibers having a length of 1 mm to 10 mm, wherein fibrillated heat-resistant fibers having a modified freeness of not more than 300 ml and fibrillated heat-resistant fibers having a modified freeness of more than 300 ml are contained as the heat-resistant fibers, and the total content of the fibrillated heat-resistant fibers having a modified freeness of not more than 300 ml and the fibrillated heat-resistant fibers having a modified freeness of more than 300 ml is not less than 2.0 mass % to less than 9.0 mass % based on the total of all the fiber components contained in the separator, wherein modified freeness is a value measured in accordance with JIS P8121-2:2012, except that an 80-mesh wire net having a wire diameter of 0.14 mm and an opening of 0.18 mm is used as a screening plate and the concentration of a sample is 0.1%.

2. The lithium ion battery separator according to claim 1, wherein the content of the fibrillated heat-resistant fibers having a modified freeness of not more than 300 ml is not less than 1.0 mass % to less than 5.0 mass % and the content of the fibrillated heat-resistant fibers having a modified freeness of more than 300 ml is not less than 1.0 mass % to less than 4.0 mass % based on the total of all the fiber components contained in the separator.

3. The lithium ion battery separator according to claim 1, wherein the content of the synthetic resin fibers is 90.0 to 98.0 mass % based on the total of all the fiber components contained in the separator.

4. A lithium ion secondary battery comprising heat-resistant fibers and synthetic resin short fibers having a length of 1 mm to 10 mm, wherein a fibrid made of para-aromatic polyamide, fibrillated heat-resistant fibers having a modified freeness of not more than 300 ml and fibrillated heat-resistant fibers having a modified freeness of more than 300 ml are contained as the heat-resistant fibers, and the total content of the heat-resistant fibers is not less than 2.0 mass % to less than 9.0 mass % based on the total of all the fiber components contained in the separator, wherein modified freeness is a value measured in accordance with JIS P8121-2:2012, except that an 80-mesh wire net having a wire diameter of 0.14 mm and an opening of 0.18 mm is used as a screening plate and the concentration of a sample is 0.1%.

5. The lithium ion secondary battery according to claim 4, wherein the content of the fibrid made of para-aromatic polyamide is not less than 0.4 mass % to less than 2.5 mass %, the content of the fibrillated heat-resistant fibers having a modified freeness of more than 300 ml is not less than 1.0 mass % to less than 4.0 mass %, and the content of the fibrillated heat-resistant fibers having a modified freeness of not more than 300 ml is not less than 0.6 mass % to less than 4.6 mass % based on the total of all the fiber components contained in the separator.

6. The lithium ion battery separator according to claim 4, wherein the content of the synthetic resin fibers is 90.0 to 98.0 mass % based on the total of all the fiber components contained in the separator.

7. The lithium ion battery separator according to claim 2, wherein the content of the synthetic resin fibers is 90.0 to 98.0 mass % based on the total of all the fiber components contained in the separator.

8. The lithium ion battery separator according to claim 5, wherein the content of the synthetic resin fibers is 90.0 to 98.0 mass % based on the total of all the fiber components contained in the separator.

9. A lithium ion battery comprising the lithium ion battery separator of claim 1.

10. A lithium ion battery comprising the lithium ion battery separator of claim 4.

* * * * *